United States Patent
Xu et al.

(10) Patent No.: US 11,277,764 B2
(45) Date of Patent: Mar. 15, 2022

(54) METHOD FOR OBTAINING DATA RADIO BEARER IDENTIFIER AND BASE STATION

(71) Applicant: HONOR DEVICE CO., LTD., Shenzhen (CN)

(72) Inventors: Haibo Xu, Beijing (CN); Nathan Edward Tenny, San Diego, CA (US); Aimin Justin Sang, San Diego, CA (US)

(73) Assignee: HONOR DEVICE CO., LTD., Shenzhen (CN)

( * ) Notice: Subject to any disclaimer, the term of this patent is extended or adjusted under 35 U.S.C. 154(b) by 58 days.

(21) Appl. No.: 16/636,468

(22) PCT Filed: Aug. 4, 2017

(86) PCT No.: PCT/CN2017/096111
§ 371 (c)(1),
(2) Date: Feb. 4, 2020

(87) PCT Pub. No.: WO2019/024115
PCT Pub. Date: Feb. 7, 2019

(65) Prior Publication Data
US 2020/0322831 A1    Oct. 8, 2020

(51) Int. Cl.
*H04W 28/02*    (2009.01)
*H04W 76/11*    (2018.01)
(Continued)

(52) U.S. Cl.
CPC ... *H04W 28/0263* (2013.01); *H04W 28/0268* (2013.01); *H04W 76/11* (2018.02); *H04W 76/15* (2018.02); *H04W 84/18* (2013.01)

(58) Field of Classification Search
None
See application file for complete search history.

(56) References Cited

U.S. PATENT DOCUMENTS

2015/0215965 A1    7/2015  Yamada
2016/0029426 A1    1/2016  Bangolae et al.
(Continued)

FOREIGN PATENT DOCUMENTS

CN    104797000 A    7/2015
CN    104797009 A    7/2015
(Continued)

OTHER PUBLICATIONS

3GPP TS 38.423 V0.1.0 (May 2017),3rd Generation Partnership Project;Technical Specification Group Radio Access Metwork;NG Radio Access Network(NG-RAN);Xn application protocol (XnAP)(Release 15),total 53 pages.

*Primary Examiner* — Ayaz R Sheikh
*Assistant Examiner* — Sori A Aga

(57) ABSTRACT

The method includes: sending, by a first base station, a first message to a second base station, where the first message is used to request to add a data radio bearer DRB; receiving, by the first base station, a second message sent by the second base station, where the second message is used to indicate an identifier of at least one DRB; and sending, by the first base station, first information to user equipment, where the first information includes DRB configuration information, and the DRB configuration information includes the identifier of the at least one DRB. In the embodiments of this application, the first base station can add the DRB based on a radio resource management policy and a network condition of the first base station, to reconfigure a mapping relationship between a QoS flow and the DRB, so that setting of the DRB is more flexible and effective.

13 Claims, 17 Drawing Sheets

(51) Int. Cl.
*H04W 76/15* (2018.01)
*H04W 84/18* (2009.01)

(56) References Cited

U.S. PATENT DOCUMENTS

| | | | |
|---|---|---|---|
| 2017/0055313 A1 | 2/2017 | Sharma et al. | |
| 2017/0155481 A1* | 6/2017 | Miao | H04W 76/15 |
| 2018/0160411 A1 | 6/2018 | Zhang et al. | |
| 2018/0160462 A1 | 6/2018 | Quan et al. | |
| 2018/0213589 A1* | 7/2018 | Wu | H04W 76/20 |
| 2019/0357093 A1* | 11/2019 | Xu | H04W 36/22 |

FOREIGN PATENT DOCUMENTS

| | | |
|---|---|---|
| CN | 106100816 A | 11/2016 |
| CN | 106717105 A | 5/2017 |
| EP | 2773157 A1 | 9/2014 |
| WO | 2017020302 A1 | 2/2017 |
| WO | 2018062949 A1 | 4/2018 |

* cited by examiner

METHOD FOR OBTAINING DATA RADIO BEARER IDENTIFIER AND BASE STATION

CROSS-REFERENCE TO RELATED APPLICATIONS

This application is a national stage of International Application No. PCT/CN2017/096111, filed on Aug. 4, 2017, which is hereby incorporated by reference in its entirety.

TECHNICAL FIELD

Embodiments of this application relate to the field of communications technologies, and in particular, to a method for obtaining a data radio bearer identifier and a base station.

BACKGROUND

A core network can establish one or more packet data unit (Packet Data Unit, PDU) sessions for user equipment (User Equipment, UE). Each PDU session includes one or more quality of service flows (Quality of Service flow, QoS flow). A radio access network can establish one or more data radio bearers (Data Radio Bearer, DRB) for each PDU session. To ensure quality of service of data packets of different quality of service flows, the radio access network may map data packets of different quality of service flows that belong to a same PDU session to different DRBs, or may map data packets of different quality of service flows that belong to a same PDU session to a same DRB. Specifically, mapping of a data packet to a DRB includes two steps. A first step is mapping from an IP flow to a QoS flow that is completed by a non access stratum (Non Access Stratum, NAS), and a second step is mapping from the QoS flow to the DRB that is completed by an access stratum (Access Stratum, AS). The mapping from the QoS flow to the DRB is determined by a base station of a radio access network. A mapping relationship between the QoS flow and the DRB may be a many-to-one relationship, or may be a one-to-one relationship.

To improve a data transmission throughput of the UE and reduce signaling overheads of the core network resulting from mobility of the UE, in an LTE system, a concept of dual connectivity is introduced, that is, the UE may receive and send data by using two base stations. In the two base stations, one base station that provides a connection to a control plane of the core network for the UE is referred to as a master eNB (Master eNB), and the other base station that provides an additional radio resource for the UE is referred to as a secondary eNB (Secondary eNB). In a 5G system, a dual connectivity technology is still used.

In a dual connectivity architecture connected by a 5G core network, a master node (Master Node, MN) determines to transfer some of QoS flows of the UE to a secondary node (Secondary Node, SN), and the SN determines mapping from some of QoS flows to the DRB. The MN may be specifically an MgNB (Master gNB) or an MeNB (Master eNB), and the SN may be specifically an SgNB (Secondary gNB) or an SeNB (Secondary eNB). Compared with a quantity of DRBs used for mapping that is from the QoS flow to the DRB and that is determined by the MN, the SN may increase or reduce DRBs. Regardless of how the SN determines a mapping relationship between QoS and the DRB, it needs to be ensured that an ID of a DRB configured to the UE is unique, that is, a case in which more than one DRB shares a same ID cannot occur. Therefore, a problem that needs to be resolved is how to manage the ID of the DRB.

SUMMARY

Embodiments of this application provide a method for obtaining a data radio bearer identifier and a base station, to ensure uniqueness of a DRB ID, so that a first base station can add the DRB based on a radio resource management policy and a network condition of the first base station, to reconfigure a mapping relationship between a QoS flow and the DRB, so that setting of the DRB is more flexible and effective.

According to a first aspect, an embodiment of this application provides a method for obtaining a data radio bearer identifier. The method includes: sending, by a first base station, a first message to a second base station, where the first message is used to request to add a data radio bearer DRB; receiving, by the first base station, a second message sent by the second base station, where the second message is used to indicate an identifier of at least one DRB; and sending, by the first base station, first information to user equipment, where the first information includes DRB configuration information, and the DRB configuration information includes the identifier of the at least one DRB.

With reference to the first aspect, in a possible implementation of the first aspect, the first information further includes information about a mapping relationship between an uplink quality of service QoS flow and the at least one DRB.

With reference to the first aspect or the possible implementation of the first aspect, in another possible implementation of the first aspect, the first base station is a secondary eNB, and the second base station is a master eNB.

With reference to any one of the first aspect or the possible implementations of the first aspect, in another possible implementation of the first aspect, the first message includes any one or more of the following information: indication information of requesting to add the DRB; a quantity of DRBs that request to be added; an identifier of a QoS flow that is mapped to the DRB that requests to be added; packet information of a QoS flow that is mapped to the DRB that requests to be added; or a packet index of a QoS flow that is mapped to the DRB that requests to be added.

With reference to any one of the first aspect or the possible implementations of the first aspect, in another possible implementation of the first aspect, the second message includes any one or more of the following information: an available DRB identifier; the identifier of the at least one DRB; an identifier of a QoS flow that allows to be mapped to the at least one DRB; an identifier of a QoS flow that rejects to be mapped to the at least one DRB; configuration information of a mapping relationship between the DRB and a QoS flow; configuration information of a mapping relationship between the DRB and a packet of a QoS flow; or configuration information of a mapping relationship between the DRB and a packet index of a QoS flow.

With reference to any one of the first aspect or the possible implementations of the first aspect, in another possible implementation of the first aspect, before the sending, by a first base station, a first message to a second base station, the method further includes: receiving, by the first base station, a third message sent by the second base station, where the third message is used to request to transfer at least one QoS flow to the first base station, or used to request the first base station to add at least one QoS flow, or used to request to transfer at least one DRB to the first base station, or used to request the first base station to add at least one DRB, where the third message includes any one or more of the following information: an identifier of the at least one QoS flow that is transferred to the first base station and a QoS parameter of the at least one QoS flow; a mapping relationship between the at least one QoS flow and the DRB; or indication information of a transfer type, where the transfer type includes at least one of QoS flow transfer and DRB transfer.

With reference to any one of the first aspect or the possible implementations of the first aspect, in another possible implementation of the first aspect, the sending, by the first base station, first information to user equipment includes: sending, by the first base station, a radio resource control reconfiguration message to the user equipment, where the radio resource control reconfiguration message includes the first information.

With reference to any one of the first aspect or the possible implementations of the first aspect, in another possible implementation of the first aspect, the method further includes: sending, by the first base station, a fourth message to the second base station, where the fourth message includes any one or more of the following information: an available DRB identifier; an identifier of a DRB selected by the first base station; or a mapping relationship that is between a QoS flow and a DRB and that is configured by the first base station.

With reference to any one of the first aspect or the possible implementations of the first aspect, in another possible implementation of the first aspect, the sending, by the first base station, first information to user equipment includes: sending, by the first base station, a fifth message to the second base station, where the fifth message includes the first information, the fifth message is used by the second base station to obtain the first information and add the first information in the radio resource control reconfiguration message sent to the user equipment.

With reference to any one of the first aspect or the possible implementations of the first aspect, in another possible implementation of the first aspect, the first information is specifically set in a radio resource control information container of the fifth message.

According to a second aspect, an embodiment of this application provides a method for obtaining a data radio bearer identifier. The method includes: receiving, by a second base station, a first message sent by a first base station, where the first message is used to request to add a data radio bearer DRB; and sending, by the second base station, a second message to the first base station, where the second message is used to indicate an identifier of at least one DRB.

With reference to the second aspect, in a possible implementation of the second aspect, the first base station is a secondary eNB, and the second base station is a master eNB.

With reference to any one of the second aspect or the possible implementations of the second aspect, in another possible implementation of the second aspect, before the receiving, by a second base station, a first message sent by a first base station, the method further includes: sending, by the second base station, a third message to the first base station, where the third message is used to request to transfer at least one QoS flow to the first base station, or used to request the first base station to add at least one QoS flow, or used to request to transfer at least one DRB to the first base station, or used to request the first base station to add at least one DRB, where the third message includes any one or more of the following information: an identifier of the at least one QoS flow that is transferred to the first base station and a QoS parameter of the at least one QoS flow; a mapping relationship between the at least one QoS flow and the DRB; or indication information of a transfer type, where the transfer type includes at least one of QoS flow transfer and DRB transfer.

With reference to any one of the second aspect or the possible implementations of the second aspect, in another possible implementation of the second aspect, the method further includes: receiving, by the second base station, a fourth message sent by the first base station, where the fourth message includes any one or more of the following information: an available DRB identifier; an identifier of a DRB selected by the first base station; or a mapping relationship that is between a QoS flow and a DRB and that is configured by the first base station.

With reference to any one of the second aspect or the possible implementations of the second aspect, in another possible implementation of the second aspect, the method further includes: receiving, by the second base station, a fifth message sent by the first base station; obtaining, by the second base station, the first information from the fifth message; and sending, by the second base station, a radio resource control reconfiguration message to the user equipment, where the radio resource control reconfiguration message includes the first information.

With reference to any one of the second aspect or the possible implementations of the second aspect, in another possible implementation of the second aspect, the obtaining, by the second base station, the first information from the fifth message includes: obtaining, by the second base station, the first information from a radio resource control information container of the fifth message.

According to a third aspect, an embodiment of this application provides a method for obtaining a data radio bearer identifier. The method includes: sending, by a first base station, a first message to a second base station, where the first message is used to indicate a currently available DRB identifier; and sending, by the first base station, first information to user equipment, where the first information includes at least one of configuration information of an added DRB and an identifier of a released DRB, and the configuration information of the added DRB includes an identifier of the added DRB.

With reference to the third aspect, in a possible implementation of the third aspect, the first base station sends the first message after updating a DRB identifier, to generate the currently available DRB identifier, where a reason for updating the DRB identifier includes at least one of adding a DRB and releasing a DRB.

With reference to any one of the third aspect or the possible implementations of the third aspect, in another possible implementation of the first aspect, the first information further includes information about a mapping relationship between an uplink QoS flow and a DRB.

With reference to any one of the third aspect or the possible implementations of the third aspect, in another possible implementation of the third aspect, the first base station is a secondary eNB, and the second base station is a master eNB; or the first base station is a master eNB, and the second base station is a secondary eNB.

With reference to any one of the third aspect or the possible implementations of the third aspect, in another possible implementation of the third aspect, the first message includes any one or more of the following information:

the currently available DRB identifier; an identifier of a DRB occupied by the first base station; an identifier of a DRB released by the first base station; or a mapping relationship that is between a QoS flow and a DRB and that is configured by the first base station.

With reference to any one of the third aspect or the possible implementations of the third aspect, in another possible implementation of the third aspect, before the sending, by a first base station, a first message to a second base station, the method further includes: receiving, by the first base station, a second message sent by the second base station, where the second message is used to indicate an available DRB identifier; and performing, by the first base station, DRB identifier update on the available DRB identifier, to generate the currently available DRB identifier.

With reference to any one of the third aspect or the possible implementations of the third aspect, in another possible implementation of the third aspect, the second message includes any one or more of the following information: the available DRB identifier; an identifier of a DRB occupied by the second base station; an identifier of a DRB released by the second base station; or a mapping relationship that is between a QoS flow and a DRB and that is configured by the second base station.

With reference to any one of the third aspect or the possible implementations of the third aspect, in another possible implementation of the third aspect, the method further includes: receiving, by the first base station, a third message sent by the second base station, where the third message is used to request to transfer at least one QoS flow to the first base station, or used to request the first base station to add at least one QoS flow, or used to request to transfer at least one DRB to the first base station, or used to request the first base station to add at least one DRB, where the third message includes any one or more of the following information: an identifier of the at least one QoS flow that is transferred to the first base station and a QoS parameter of the at least one QoS flow; a mapping relationship between the at least one QoS flow and the DRB; indication information of a transfer type; or an available DRB identifier, where the transfer type includes at least one of QoS flow transfer and DRB transfer.

With reference to any one of the third aspect or the possible implementations of the third aspect, in another possible implementation of the first aspect, the sending, by the first base station, first information to user equipment includes:

sending, by the first base station, a radio resource control reconfiguration message to the user equipment, where the radio resource control reconfiguration message includes the first information.

With reference to any one of the third aspect or the possible implementations of the third aspect, in another possible implementation of the third aspect, the sending, by the first base station, first information to user equipment includes: sending, by the first base station, a fourth message to the second base station, where the fourth message includes the first information, the fourth message is used by the second base station to obtain the first information and add the first information in the radio resource control reconfiguration message sent to the user equipment.

With reference to any one of the third aspect or the possible implementations of the third aspect, in another possible implementation of the first aspect, the fourth message further includes second information, and the second information is used to indicate that a reason for sending the fourth message is to change the mapping relationship between the QoS flow and the DRB.

According to a fourth aspect, an embodiment of this application provides a first base station. The first base station has functions of implementing behavior of the first base station in the foregoing method embodiments. The functions may be implemented by using hardware, or may be implemented by executing corresponding software by using hardware. The hardware or the software includes one or more modules corresponding to the foregoing functions.

According to a fifth aspect, an embodiment of this application provides a first base station. The first base station includes a processor, a memory, a bus, and a communications interface, where the memory is configured to store a computer-executable instruction, the processor is connected to the memory by using the bus, and when the first base station runs, the processor executes the computer-executable instruction stored in the memory, so that the first base station performs the method for obtaining a data radio bearer identifier according to any one of the first aspect or the method for obtaining a data radio bearer identifier according to any one of the third aspect.

According to a sixth aspect, an embodiment of this application provides a computer-readable storage medium. The computer-readable storage medium is configured to store a computer software instruction used by the first base station. When the computer-readable storage medium runs on a computer, the computer is enabled to perform the method for obtaining a data radio bearer identifier according to any one of the first aspect or the method for obtaining a data radio bearer identifier according to any one of the third aspect.

According to a seventh aspect, an embodiment of this application provides a computer program product that includes an instruction. When the computer program product runs on a computer, the computer is enabled to perform the method for obtaining a data radio bearer identifier according to any one of the first aspect or the method for obtaining a data radio bearer identifier according to any one of the third aspect.

According to an eighth aspect, an embodiment of this application provides a second base station. The second base station has functions of implementing behavior of the second base station in the foregoing method embodiments. The functions may be implemented by using hardware, or may be implemented by executing corresponding software by using hardware. The hardware or the software includes one or more modules corresponding to the foregoing functions.

According to a ninth aspect, an embodiment of this application provides a second base station. The second base station includes a processor, a memory, a bus, and a communications interface, where the memory is configured to store a computer-executable instruction, the processor is connected to the memory by using the bus, and when the second base station runs, the processor executes the computer-executable instruction stored in the memory, so that the access and mobility management function component performs the method for obtaining a data radio bearer identifier according to any one of the second aspect.

According to a tenth aspect, an embodiment of this application provides a computer-readable storage medium. The computer-readable storage medium is configured to store a computer software instruction used by the foregoing second base station. When the computer-readable storage medium runs on a computer, the computer is enabled to perform the method for obtaining a data radio bearer identifier according to any one of the second aspect.

According to an eleventh aspect, an embodiment of this application provides a computer program product that includes an instruction. When the computer program product runs on a computer, the computer is enabled to perform the method for obtaining a data radio bearer identifier according to any one of the second aspect.

According to a twelfth aspect, an embodiment of this application provides a communications system. The communications system includes the first base station according to the fourth aspect and the second base station according to the eighth aspect.

In the method for obtaining a data radio bearer identifier and the base station according to the embodiments of this application, the first base station sends the first message to the second base station to request to add the DRB, the second base station feeds back the second message to the first base station, the first base station may obtain, based on the second message, a DRB identifier that may be used by the first base station, the first base station adds the DRB by using the DRB identifier, and the first base station sends an identifier of the added DRB to user equipment, to ensure uniqueness of the DRB ID, so that the first base station can add the DRB based on a radio resource management policy and a network condition of the first base station, to reconfigure a mapping relationship between a QoS flow and the DRB, so that setting of the DRB is more flexible and effective.

DESCRIPTION OF EMBODIMENTS

To make the objective, technical solutions, and advantages of embodiments of this application clearer, the following clearly and completely describes the technical solutions in the embodiments of the application with reference to the accompanying drawings in the embodiments of this application.

Figure 1:
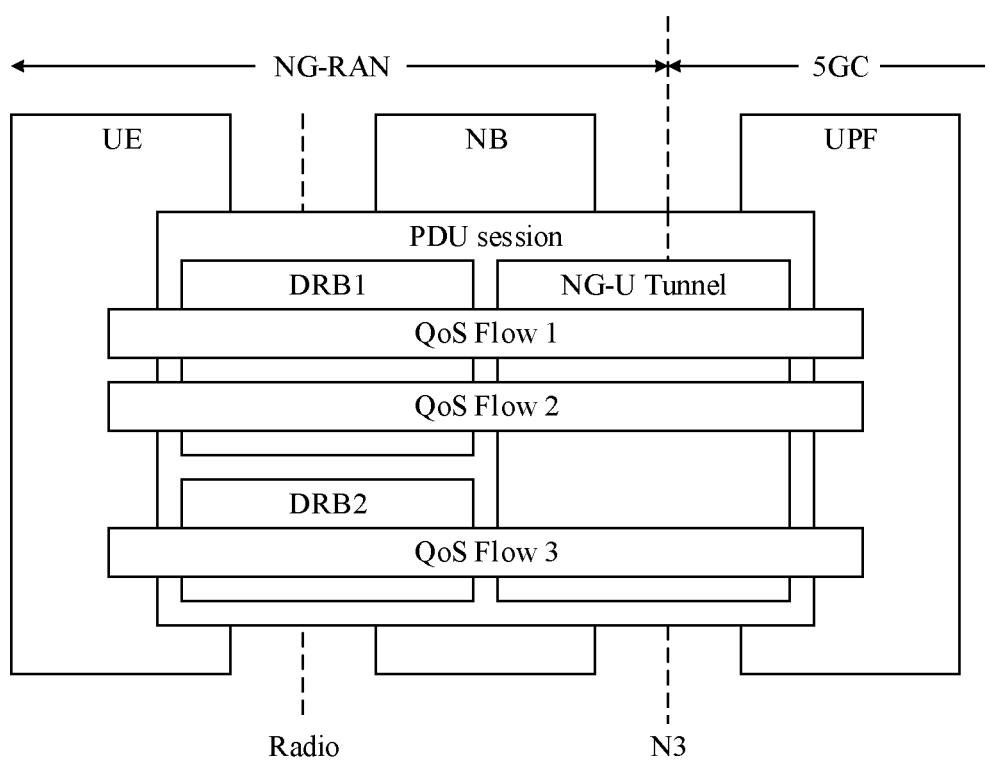
FIG. 1 is a schematic diagram of a QoS architecture according to this application.

FIG. 1 is a schematic diagram of a QoS architecture according to this application. As shown in FIG. 1, a user plane function entity (User Plane Function, UPF) of a 5G core network side (5G Core network) establishes one or more PDU sessions for UE. For each PDU session of each UE, a gNB (gNB) of a 5G access network (NG-RAN) establishes one or more DRBs, and the NG-RAN maps data packets belonging to different PDU sessions to different DRBs. Specifically, a 5GC and the NR-RAN map a data packet of a PDU session to an appropriate QoS flow and an appropriate DRB, to ensure quality of service of the data packet. Mapping from the QoS flow to the DRB is determined by the base station. As shown in FIG. 1, a mapping relationship between the QoS flow and the DRB may be one-to-one, or may be many-to-one, that is, as shown in FIG. 1, a DRB 1 bears a QoS flow 1 and a QoS flow 2, and a DRB 2 bears a QoS flow 3.

Figure 2A:
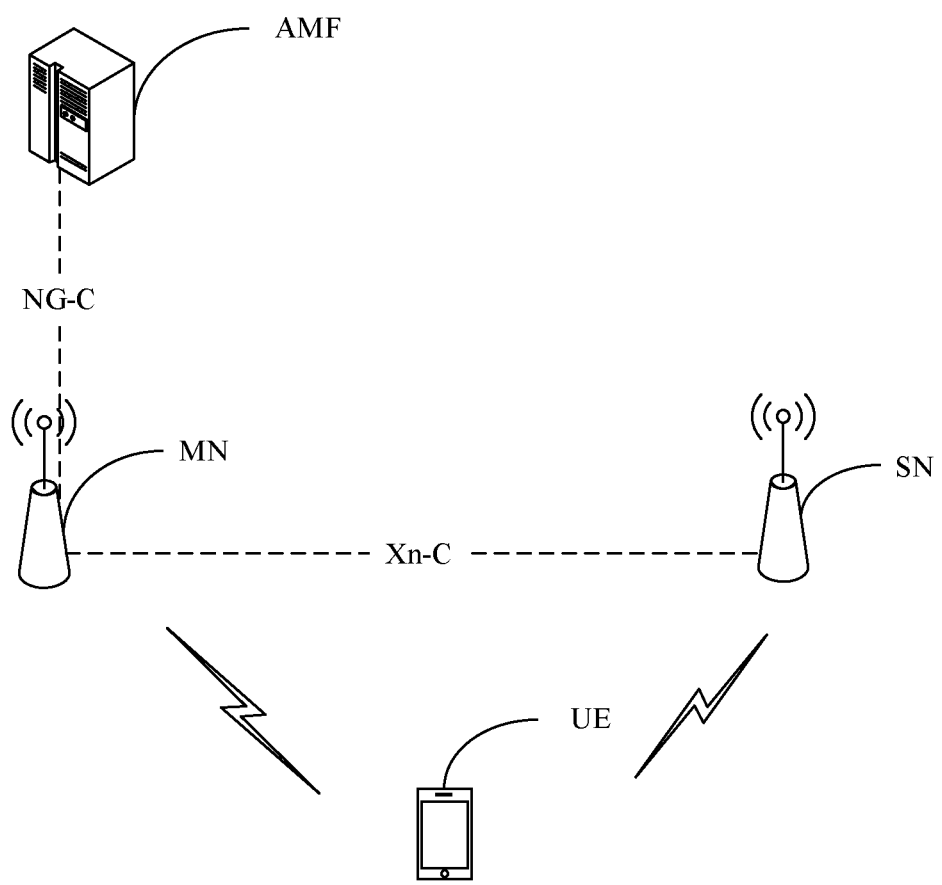
FIG. 2A is a schematic diagram of a control plane of a dual connectivity architecture according to this application.
Figure 2B:
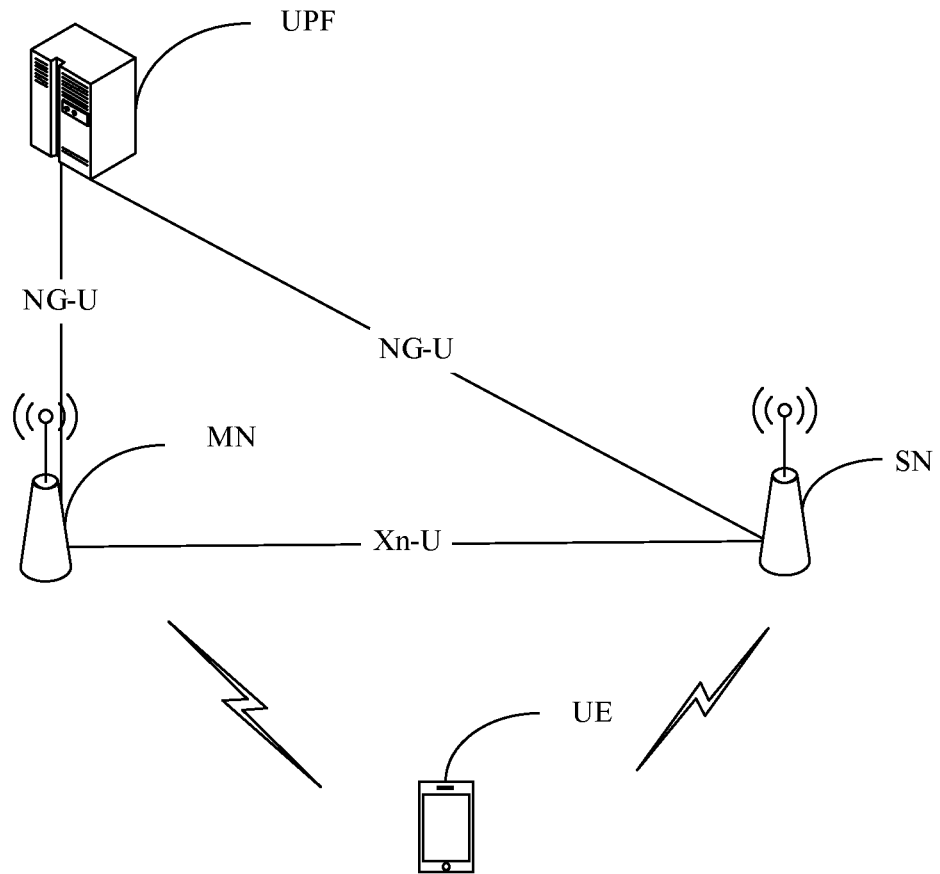
FIG. 2B is a schematic diagram of a user plane of a dual connectivity architecture according to this application.

FIG. 2A is a schematic diagram of a control plane of a dual connectivity architecture according to this application, and FIG. 2B is a schematic diagram of a user plane of a dual connectivity architecture according to this application. As shown in FIG. 2A and FIG. 2B, the UE may receive and send data by using an MN and an SN. On a control plane, an access and mobility management function entity (Core Access and Mobility Management Function, AMF) is connected to the MN, the MN is connected to the SN, and the MN provides a control plane connection to a core network for the UE. An NG-C is a control plane interface between the AMF and the MN, and Xn-C is a control plane interface between the MN and the SN. On a user plane, a UPF is connected to the MN and the SN, and the MN is connected to the SN. The MN and the SN jointly provide a user plane connection to the core network for the UE, and the SN may provide an additional radio resource for the UE. NG-Us are user plane interfaces between the UPF and the MN and between the UPF and the SN, and an Xn-U is a user plane interface between the MN and the SN. In the dual connectivity architecture, the MN may transfer, to the SN, a QoS flow of the UE transmitted by the MN or a DRB of the UE transmitted by the MN, and performs transmission by using the SN. The method for obtaining a DRB identifier in the embodiments of this application can ensure uniqueness of the DRB identifier in the dual connectivity architecture, so that the SN can determine a mapping relationship between a QoS flow of the SN and a DRB, in other words, the SN may add or release a DRB based on a radio resource management policy and a network condition of the SN, to reconfigure the mapping relationship between the QoS flow and the DRB, so that setting of the DRB in the dual connectivity architecture is more flexible and effective.

FIG. 1, FIG. 2A, and FIG. 2B all use a 5G network as an example. It should be noted that the method for obtaining a DRB identifier in the embodiments of this application is also applicable to an LTE network. The MN and the SN in the embodiments of this application may be specifically an eNB, or may be a base station of the NG-RAN, namely, the gNB.

The UE in this application may include a handheld device, a vehicle-mounted device, a wearable device, and a computing device that have a wireless communication function or another processing device connected to a wireless modem, and user equipments (User Equipment, UE for short), mobile stations (Mobile Station, MS for short), terminals (terminal), terminal equipments (Terminal Equipment) and the like in various forms. For ease of description, in this application, they are referred to as user equipment or UE for short.

A DRB of a first base station in this application, namely, a DRB of the SN, may be an SCG DRB, or may be an SCG split DRB.

For details of a specific implementation of the method for obtaining a DRB identifier in the embodiments of this application, refer to explanations and descriptions in the following embodiments.

Figure 3:
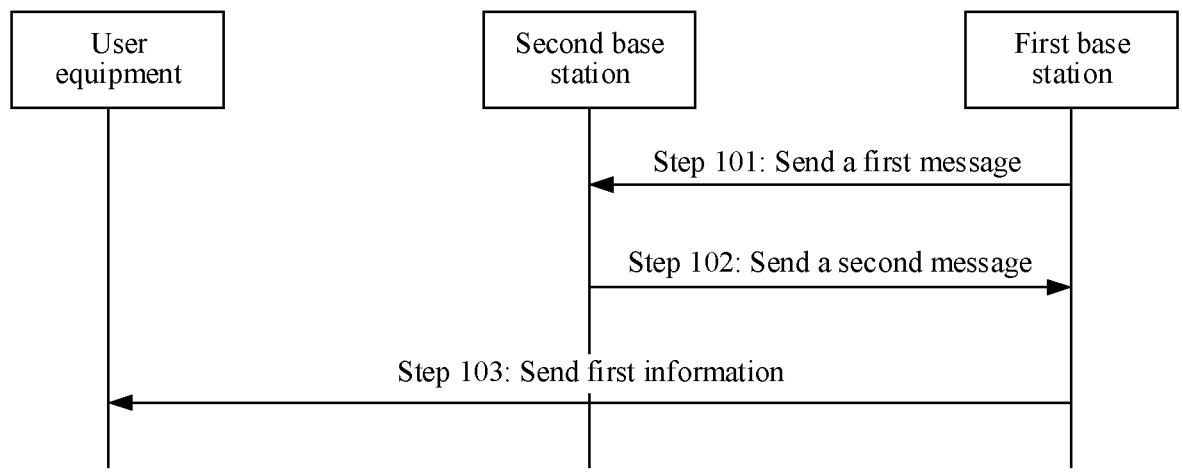
FIG. 3 is a flowchart of a method for obtaining a DRB identifier according to this application.

FIG. 3 is a flowchart of a method for obtaining a DRB identifier according to this application. As shown in FIG. 3, this embodiment includes user equipment, a first base station, and a second base station, and the method in this embodiment may include the following steps.

Step 101: The first base station sends a first message to the second base station, and the second base station receives the first message sent by the first base station, where the first message is used to request to add a DRB.

When determining that the DRB needs to be added, the first base station may send the first message to the second base station, to request to add the DRB. The second base station receives the first message, and learns that the first base station needs to add the DRB.

Step 102: The second base station sends a second message to the first base station, and the first base station receives the second message sent by the second base station, where the second message is used to indicate an identifier of at least one DRB.

After learning that the first base station needs to add the DRB, the second base station may send the second message to the first base station based on a usage status of the DRB identifier. The second message is used to indicate identifiers of one or more DRBs, and the identifiers of the one or more DRBs are identifiers of DRBs allocated by the second base station to the first base station, namely, identifiers of DRBs that the second base station allows the first base station to use. The first base station may learn of, based on the second message, a quantity of DRBs that the second base station allows the first base station to add and corresponding DRB identifiers, to complete adding the DRB and remapping between a QoS flow and the DRB.

Step 103: The first base station sends first information to the user equipment, and the user equipment receives the first information sent by the first base station, where the first information includes DRB configuration information, and the DRB configuration information includes the identifier of the at least one DRB.

After step 101 and step 102 are performed, the first base station may send the DRB configuration information to the user equipment. The DRB configuration information may include identifiers of one or more DRBs. In other words, the DRB configuration information may include an identifier of a DRB added by an SN. Certainly, it may be understood that the DRB configuration information may further include configuration information of a PDCP, RLC, and a logical channel that correspond to the DRB, details are not described herein one by one.

Optionally, the first information may further include information about a mapping relationship between an uplink QoS flow and the at least one DRB. Specifically, in a downlink transmission scenario, the user equipment may not need to learn of a mapping relationship between a downlink QoS flow and the DRB, but the user equipment may obtain, as described above, an identifier of a DRB added by the first base station and configuration information of a PDCP, RLC, and a logical channel that correspond to the DRB. However, in an uplink transmission scenario, in addition to obtaining the identifier of the DRB added by the first station, the user equipment also needs to obtain information about a mapping relationship between the uplink QoS flow and the DRB. Therefore, the first information may further include the information about the mapping relationship between the uplink QoS flow and the at least one DRB, and the mapping relationship between the uplink QoS flow and the at least one DRB may be specifically a mapping relationship between the DRB identifier and an identifier of a QoS flow. It may be understood that, in an implementation, the information about the mapping relationship between the uplink QoS flow and the at least one DRB may be specifically a mapping relationship between the DRB added by the first base station and the uplink QoS flow. In another implementation, the information about the mapping relationship between the uplink QoS flow and the at least one DRB may be specifically a mapping relationship between all DRBs of the first base station and the uplink QoS flow.

The first base station in this embodiment of this application may be specifically a secondary eNB, namely, the SN shown in FIG. 2A and FIG. 2B, and the second base station may be specifically a master eNB, namely, the MN shown in FIG. 2A and FIG. 2B.

A specific form of the first message and information specifically carried in the first message include a plurality of different implementations.

In an implementation, the first message may be a message of a new type. When receiving the first message, the second base station may learn that the first base station requests to add the DRB.

In another implementation, the first message may include any one or more of the following information: (1) indication information of requesting to add the DRB; (2) a quantity of DRBs that request to be added; (3) an identifier of a remapped QoS flow; (4) packet information of a remapped QoS flow; or (5) a packet index of a remapped QoS flow.

The following specifically explains and describes the foregoing information of the first message separately.

In an implementation, the first message may include (1) the indication information of requesting to add the DRB. The second base station determines, according to the indication information of requesting to add the DRB, that the first base station requests to add the DRB and feeds back all currently available DRB identifiers to the first base station.

In another implementation, the first message may include (2) the quantity of DRBs that request to be added. The second base station determines, based on the quantity of DRBs that request to be added, that the first base station requests to add the DRB and feeds back an identifier of at least one DRB to the first base station. It should be noted that, a quantity of identifiers of the at least one DRB may be equal to the quantity of DRBs that request to be added.

In still another implementation, the first message may include (3) the identifier of the remapped QoS flow. The remapped QoS flow is a QoS flow mapped to a DRB that needs to be added by the SN. The second base station determines, based on the identifier of the remapped QoS flow, that the first base station requests to add the DRB, and feeds back the identifier of the at least one DRB to the first base station. It should be noted that, the second base station may further feed back, based on the identifier of the remapped QoS flow to the first base station, an identifier of a QoS flow that allows or rejects to be remapped, or configuration information of the mapping relationship between the DRB and the QoS flow.

In yet another implementation, the first message may include (4) the packet information of the remapped QoS flow. The remapped QoS flow is a QoS flow mapped to a DRB that needs to be added by the SN. The second base station determines, based on the packet information of the remapped QoS flow, that the first base station requests to add the DRB, and feeds back the identifier of the at least one DRB to the first base station. It should be noted that, the second base station may further feed back, based on the packet information of the remapped QoS flow, configuration information of a mapping relationship between the DRB and a packet of the QoS flow to the first base station. The packet of the QoS flow specifically includes one or more QoS flows. A QoS flow in each packet may be mapped to a same newly added DRB. It may be understood that, a quantity of packets may implicitly indicate a quantity of DRBs that the first base station requests to add.

In yet another implementation, the first message may include (5) the packet index of the remapped QoS flow. The remapped QoS flow is a QoS flow mapped to a DRB that needs to be added by the SN. The second base station determines, based on the packet index of the remapped QoS flow, that the first base station requests to add the DRB, and feeds back the identifier of the at least one DRB to the first base station. It should be noted that, the second base station may further feed back, based on the packet index of the remapped QoS flow, configuration information of a mapping relationship between the DRB and the packet index of the QoS flow to the first base station. The packet index of the remapped QoS flow specifically refers to an identifier that is used to indicate a packet including one or more QoS flows.

In yet another implementation, the first message may include (1) and (2).

In yet another implementation, the first message may include (1) and (3).

In yet another implementation, the first message may include (1) and (4).

In yet another implementation, the first message may include (1) and (5).

In yet another implementation, the first message may include (1), (2), and (3).

In yet another implementation, the first message may include (4) and (5).

In yet another implementation, the first message may include (1), (4), and (5).

The second base station receives the first message, and learns, based on the foregoing information carried in the first message, that the first base station requests to add the DRB.

After learning that the first base station requests to add the DRB, the second base station may feed back the second message to the first base station, to indicate the identifier of the at least one DRB in the first base station.

A specific form of the second message and information specifically carried in the second message include a plurality of different implementations.

The second message may specifically include any one or more of the following information: (1) an available DRB identifier; (2) the identifier of at least one DRB; (3) an identifier of a QoS flow that allows to be mapped to the at least one DRB; (4) an identifier of a QoS flow that rejects to be mapped to the at least one DRB; (5) configuration information of a mapping relationship between the DRB and a QoS flow; (6) configuration information of a mapping relationship between the DRB and a packet of a QoS flow; or (7) configuration information of a mapping relationship between the DRB and a packet index of a QoS flow.

The first base station may learn of, based on the second message, the quantity of DRBs that the second base station allows the first base station to add and corresponding DRB identifiers.

Optionally, the first base station may further determine, based on (3) the identifier of the QoS flow that allows to be mapped to the at least one DRB, a QoS flow that the second base station allows to be mapped to an added DRB. It should be noted that, when the second base station allows all QoS flows that the first base station requests to map to be mapped to the added DRB, the second message may explicitly include indication information that all QoS flows that request to be remapped may be remapped, and the second message may further implicitly indicate, by using information including no QoS flow, that all QoS flows that request to be remapped may be remapped. Therefore, the first base station may determine that the second base station allows all QoS flows that request to be remapped to be mapped to the added DRB.

The first base station may further determine, based on (4) the identifier of the QoS flow that rejects to be mapped to the at least one DRB, a QoS flow that the second base station rejects to be remapped to the added DRB.

The first base station may further determine, based on (5) the configuration information of the mapping relationship between the DRB and the QoS flow, the mapping relationship between the DRB and the QoS flow. (5) The configuration information of the mapping relationship between the DRB and the QoS flow may be specifically a mapping relationship between an identifier of the DRB and an identifier of the QoS flow.

The first base station may further determine, based on (6) the configuration information of the mapping relationship between the DRB and the packet of the QoS flow, the mapping relationship between the DRB and the packet of the QoS flow. It should be noted that, when the second message includes (6) the configuration information of the mapping relationship between the DRB and the packet of the QoS flow, the second message may further include an identifier of a QoS flow of each packet. The identifier of the QoS flow is used to indicate a QoS flow that allows to be mapped to the added DRB in the packet. It may be understood that, for a packet that does not include an identifier of a QoS flow, the second message implicitly indicates that all QoS flows in the packet may be mapped to the added DRB.

The first base station may further determine, based on (7) the configuration information of the mapping relationship between the DRB and the packet index of the QoS flow, the mapping relationship between the DRB and the packet index of the QoS flow. The second message may further include, in addition to (7), a QoS flow identifier of a packet of a QoS flow that may be remapped to the added DRB. It may be understood that a packet of a QoS flow in the second message does not include an identifier of the QoS flow, and therefore, the second message may implicitly indicate that all QoS flows in the packet of the QoS flow may be remapped.

Specifically, the first message and the second message may be flexibly set according to a requirement, to manage the DRB identifier in a dual connectivity architecture, so that the SN flexibly sets the mapping relationship between the DRB and the QoS flow in the dual connectivity architecture.

Optionally, before the foregoing step 101, the method in this of this application may further include: receiving, by the first base station, a third message sent by the second base station, and sending, by the second base station, the third message to the first base station, where the third message is used to request to transfer at least one QoS flow to the first base station, or used to request the first base station to add at least one QoS flow, or used to request to transfer at least one DRB to the first base station, or used to request the first base station to add at least one DRB.

Specifically, the third message may include any one or more of the following information: an identifier of the at least one QoS flow that is transferred to the first base station and a QoS parameter of the at least one QoS flow; a mapping relationship between the at least one QoS flow and the DRB; or indication information of a transfer type.

The transfer type may include at least one of QoS flow transfer and DRB transfer.

Figure 4A:
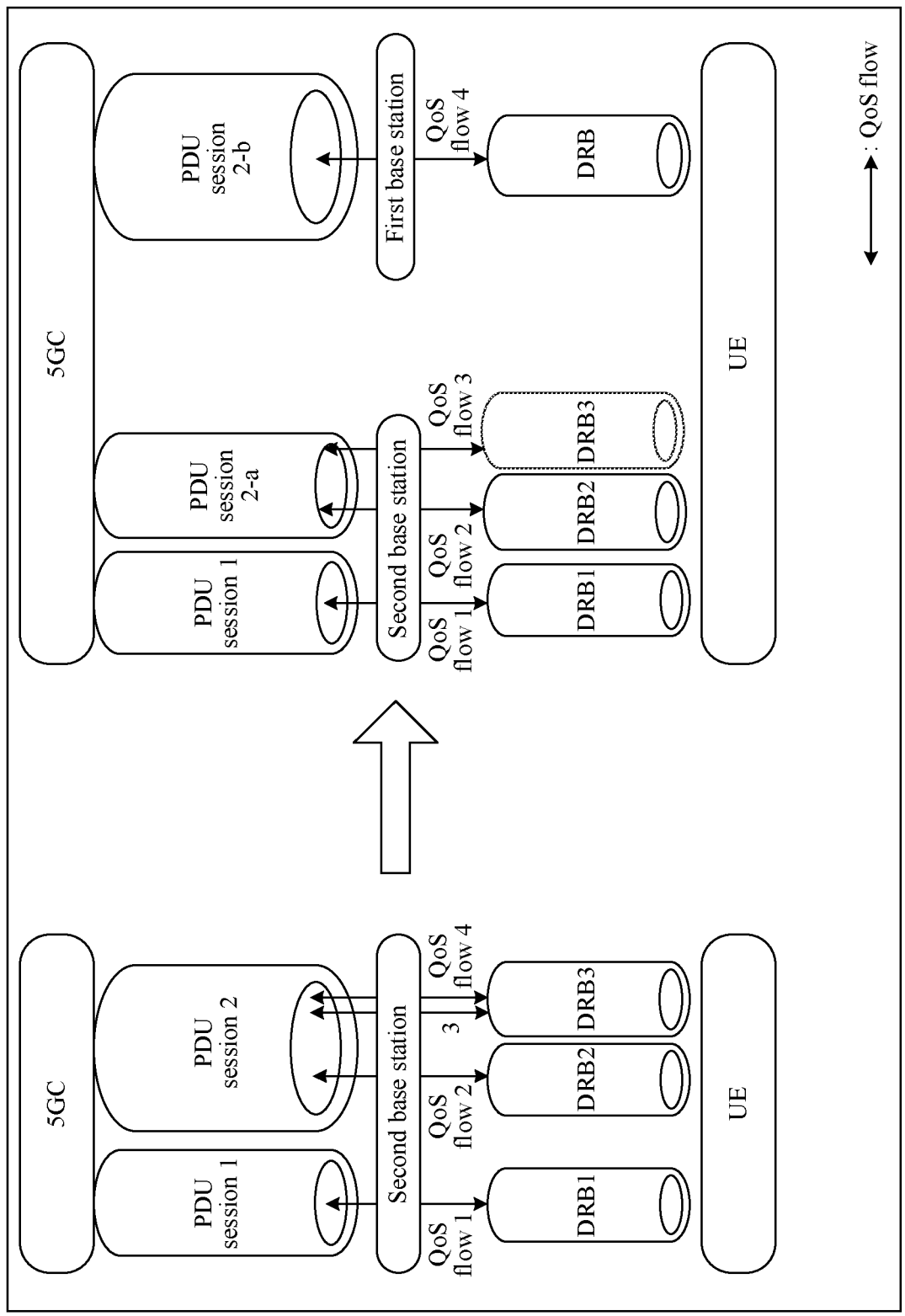
FIG. 4A is a schematic diagram of QoS flow transfer in a dual connectivity architecture.

The QoS flow transfer is transfer of QoS flows performed by using the QoS flow as granularity, in other words, transferred QoS flows are some of QoS flows in at least one DRB configured by the second base station, rather than all QoS flows in the at least one DRB. For example, FIG. 4A is a schematic diagram of QoS flow transfer in a dual connectivity architecture. A left side of FIG. 4A is a schematic diagram before transfer, and the left side of FIG. 4A is a schematic diagram after transfer. As shown in the schematic diagram of a right side of FIG. 4A, before transfer, a DRB 1 of the second base station transmits a QoS flow 1, the QoS flow 1 belongs to a PDU session 1, a DRB 2 of the second base station transmits a QoS flow 2, a DRB 3 of the second base station transmits a QoS flow 3 (3 in the figure) and a QoS flow 4, the QoS flow 2, the QoS flow 3, and the QoS flow 4 belong to a PDU session 2, and the second base station may transfer the QoS flow 4 to the first base station for transmission. As shown in the right side of FIG. 4A, after transfer, the QoS flow 4 of the PDU session 2 is transmitted by a DRB of the first base station, and a DRB identifier allocated by the second base station is used as a DRB identifier of the DRB of the first base station.

Figure 4B:
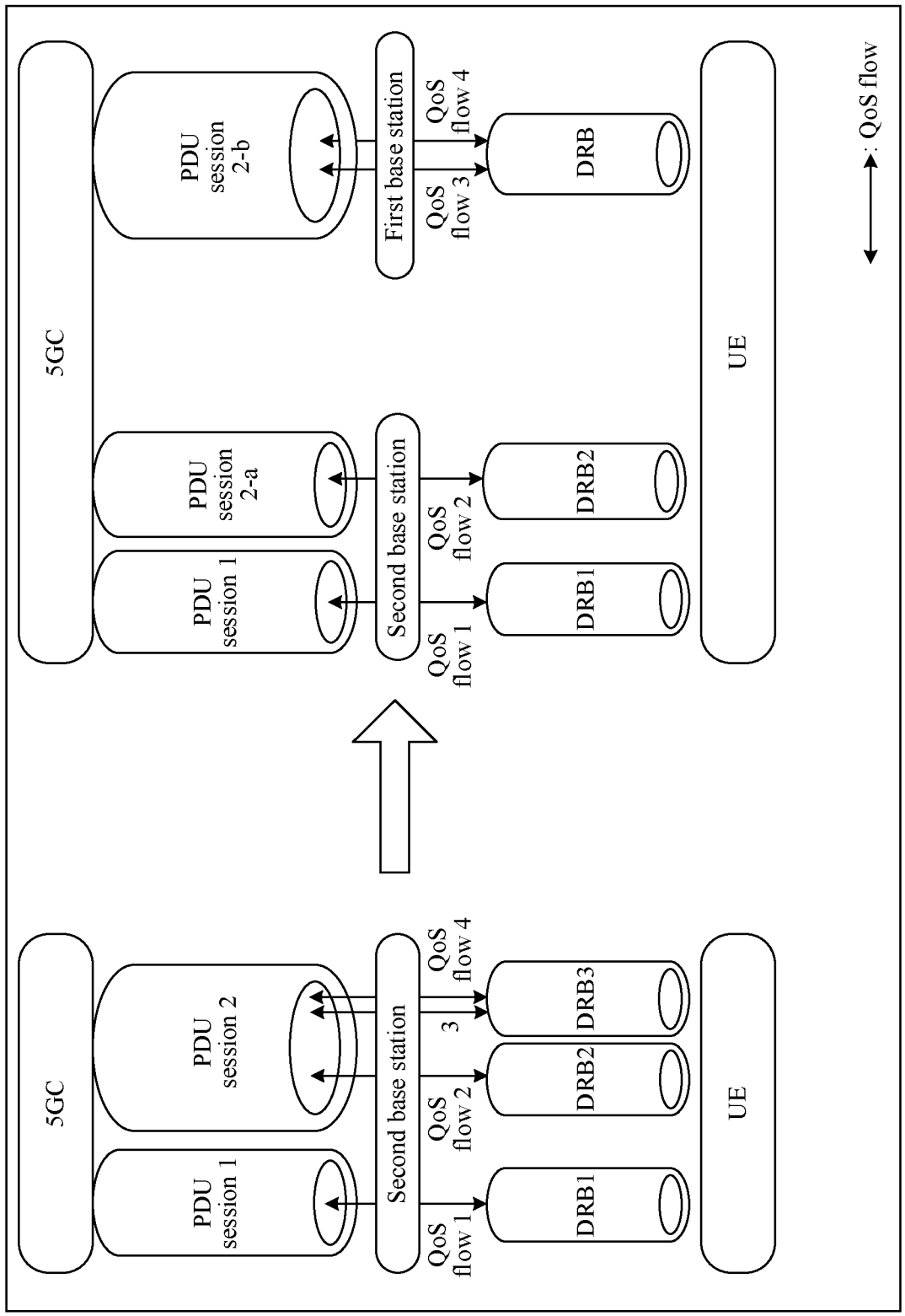
FIG. 4B is a schematic diagram of DRB transfer in a dual connectivity architecture.

The DRB transfer is transfer of QoS flows performed by using the DRB as granularity, in other words, transferred QoS flows are all QoS flows in at least one DRB configured by the second base station. For example, FIG. 4B is a schematic diagram of DRB transfer in a dual connectivity architecture. A left side of FIG. 4B is a schematic diagram before transfer, and a right side of FIG. 4B is a schematic diagram after transfer. As shown in the schematic diagram of the left side of FIG. 4B, before transfer, the DRB 1 of the second base station transmits the QoS flow 1, the QoS flow 1 belongs to the PDU session 1, the DRB 2 of the second base station transmits the QoS flow 2, the DRB 3 of the second base station transmits the QoS flow 3 (3 in the figure) and the QoS flow 4, the QoS flow 2, the QoS flow 3, and the QoS flow 4 belong to the PDU session 2, and the second base station may transfer the DRB 3 to the first base station for transmission. As shown in the right side of FIG. 4B, after transfer, the QoS flow 3 and the QoS flow 4 of the PDU session 2 are transmitted by the DRB of the first base station, and the DRB identifier of the DRB of the first base station uses the DRB identifier allocated by the second base station, for examples, may use an identifier of the DRB 3 before transfer.

FIG. 4A and FIG. 4B are used as examples for further description. If the second base station transfers the PDU session 2 to the first base station for transmission, the transfer relates to both the QoS flow transfer and the DRB transfer.

After the first base station accepts the transfer of the second base station, if it is determined that the DRB needs to be added to reconfigure mapping between the QoS flow and the DRB, subsequent step 101 to step 103 may be performed.

The mapping relationship between the at least one QoS flow and the DRB and the indication information of the transfer type are included in a radio resource control information container (RRC Container), and the radio resource control information container (RRC Container) is included in the third message.

Optionally, an implementation of the foregoing step 103 is that the first base station sends a radio resource control (Radio Resource Control, RRC) reconfiguration message to the user equipment, and the user equipment receives the radio resource control reconfiguration message sent by the first base station. The radio resource control reconfiguration message may include the first information.

Based on the implementation of the foregoing step 103, the method for obtaining a DRB identifier in this embodiment of this application may further include: sending, by the first base station, a fourth message to the second base station, and receiving, by the second base station, the fourth message sent by the first base station, where the fourth message includes any one or more of the following information: (1) an available DRB identifier; (2) an identifier of a DRB selected by the first base station; or (3) a mapping relationship that is between a QoS flow and a DRB and that is configured by the first base station.

It should be noted that the available DRB identifier in the fourth message and the available DRB identifier in the second message are different. Specifically, the available DRB identifier in the second message is a currently available DRB identifier that is fed back by the second base station after receiving the first message sent by the first base station, and the available DRB identifier in the fourth message is a DRB identifier that is obtained by the first base station after selecting a DRB identifier used by the added DRB from the available DRB identifier of the first message and after updating the available DRB identifier of the first message.

Optionally, another implementation of the foregoing step 103 is that the first base station sends a fifth message to the second base station, and the second base station receives the fifth message sent by the first base station, where the fifth message may include the first information, the fifth message is used by the second base station to obtain the first information and add the first information in the radio resource control reconfiguration message sent to the user equipment.

The first information may be specifically included in the radio resource control information container (RRC Container), and the radio resource control information container is included in the fifth message.

It should be noted that the sending, by the second base station, a second message to the first base station is used to indicate that the first base station is allowed to add the DRB, and when the second base station does not allow the first base station to add the DRB, the second base station may send a rejection message to the first base station, to indicate to the first base station that a request for adding the DRB is rejected.

In this embodiment, the first base station sends the first message to the second base station to request to add the DRB, the second base station feeds back the second message to the first base station, the first base station may obtain, based on the second message, the DRB identifier that may be used by the first base station, the first base station adds the DRB by using the DRB identifier, and the first base station sends an identifier of the added DRB to the user equipment, to ensure uniqueness of the DRB ID, so that the first base station can add the DRB based on a radio resource management policy and a network condition of the first base station, to reconfigure a mapping relationship between a QoS flow and the DRB, so that setting of the DRB is more flexible and effective.

The technical solutions of the method embodiment shown in FIG. 3 are described in detail below by using several specific embodiments.

Figure 5:
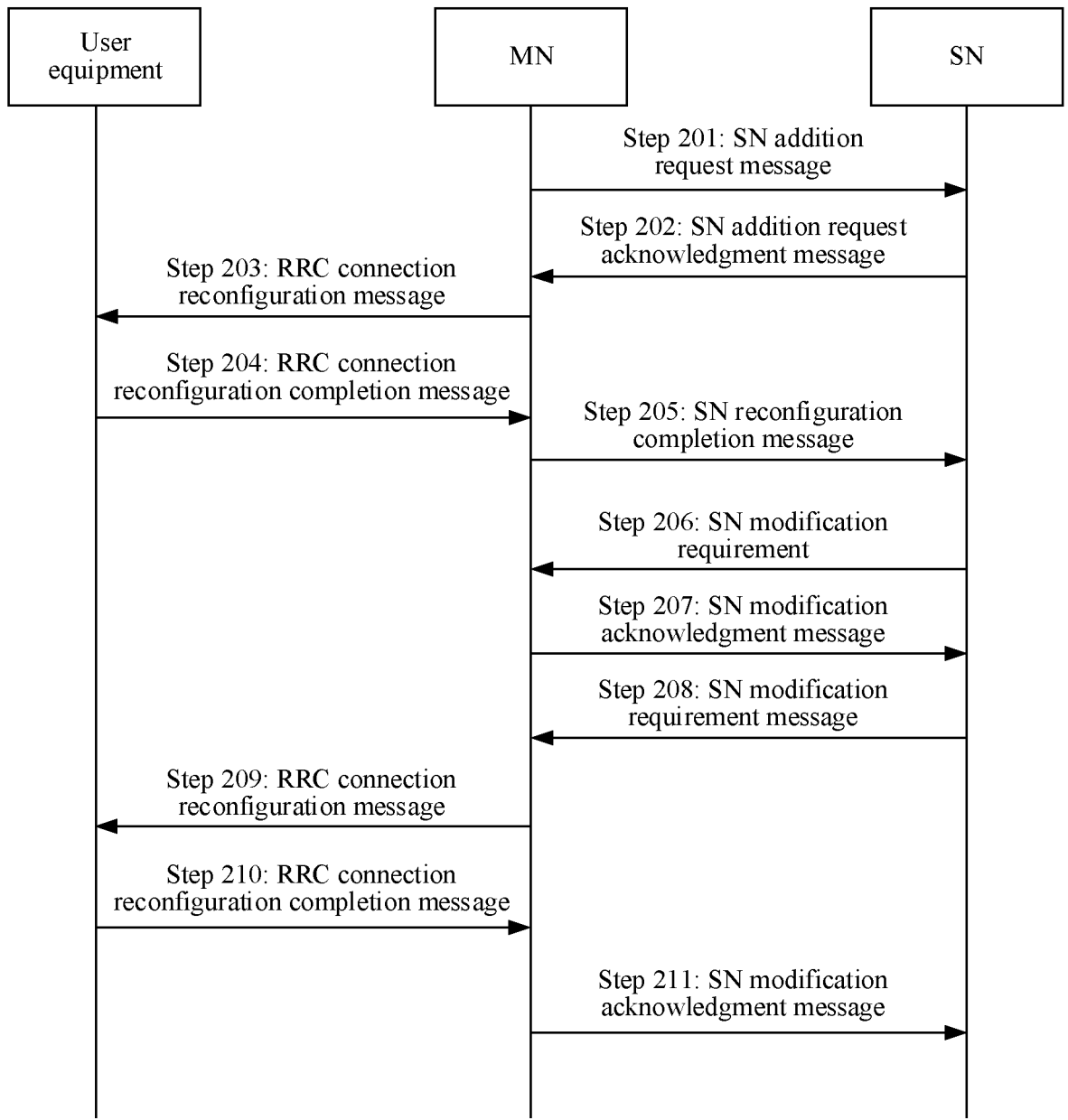
FIG. 5 is a flowchart of another method for obtaining a DRB identifier according to this application.

FIG. 5 is a flowchart of another method for obtaining a DRB identifier according to this application. In this embodiment, a first base station is an SN, and a second base station is an MN. As shown in FIG. 5, and the method in this embodiment may include the following steps.

Step 201: The MN sends an SN addition request message to the SN.

Specifically, when the MN determines to request the SN to transmit some of QoS flows of UE, step 201 may be performed. The SN addition request message may include an identifier of a QoS flow that the MN requests the SN to transmit and a corresponding QoS parameter. The SN addition request message may further include an RRC Container, and the RRC Container includes configuration information of a mapping relationship that is between the identifier of the QoS flow that is transferred to the SN for transmission and a DRB identifier and that is configured by the MN.

The SN addition request message may be a specific implementation of the third message in the embodiment shown in FIG. 3.

Step 202: The SN sends an SN addition request acknowledgment message to the MN.

Specifically, when the SN receives the foregoing SN addition request message of the MN, step 202 may be performed. After receiving the SN addition request message sent by the MN, the SN performs configuration based on the QoS parameter and the mapping relationship between the identifier of the QoS flow and the DRB identifier that are provided by the MN. The SN addition request acknowledgment message may include an identifier of a QoS flow that the SN agrees to accept. In addition, the SN addition request acknowledgment message may further include an RRC Container. The RRC Container includes a radio resource configuration information and a radio bearer configuration information of the SN.

Step 203: The MN sends an RRC connection reconfiguration message to the UE.

The RRC connection reconfiguration message carries information about the RRC Container in the SN addition request acknowledgment message.

Step 204: The MN receives an RRC connection reconfiguration completion message sent by the UE.

Step 205: The MN sends an SN reconfiguration completion message to the SN.

Step 206: The SN initiates an SN modification process, and sends an SN modification requirement message to the MN.

An objective for the SN to initiate the SN modification process is to trigger adding the DRB, and more specifically, the step is to request the MN to allocate the DRB ID. In this step, the SN modification requirement message may be a specific implementation of the first message in the embodiment shown in FIG. 3. Specifically, for specific explanations and descriptions of step 206, refer to explanations and descriptions of step 101 in the embodiment shown in FIG. 3. Details are not described herein again. For specific explanations and descriptions of the first message, refer to explanations and descriptions of the embodiment shown in FIG. 3. Details are not described herein again.

Step 207: The MN sends an SN modification acknowledgment message to the SN.

In this embodiment, the SN modification acknowledgment message may be a specific implementation of the second message in the embodiment shown in FIG. 3. Specifically, for specific explanations and descriptions of step 207, refer to explanations and descriptions of step 102 in the embodiment shown in FIG. 3. Details are not described herein again.

Step 208: The SN initiates the SN modification process, and the SN sends the SN modification requirement message to the MN.

The objective for the SN to initiate the SN modification process is to trigger adding the DRB, and more specifically, the step is to configure the added DRB. In this step, the SN modification requirement message may be the fifth message in the embodiment shown in FIG. 3. For specific explanations and descriptions of the fifth message, refer to specific explanations and descriptions of the embodiment shown in FIG. 3. Details are not described herein again. In other words, the fifth message may include first information. The first information may include configuration information of the added DRB, and the like. Specifically, the fifth message may include an RRC Container, and the RRC Container carries the first information, that is, carries the configuration information of the added DRB. The configuration information of the added DRB may include an identifier of a DRB added by the SN. Certainly, it may be understood that the configuration information of the added DRB may further include configuration information of a PDCP, RLC, and a logical channel that correspond to the added DRB, and the like.

Step 209: The MN sends the RRC connection reconfiguration message to the UE. The RRC connection reconfiguration message includes the first information.

Specifically, the MN may take out the first information in the RRC Container in the SN modification requirement message received in step 208, and set the first information in the RRC connection reconfiguration message.

Step 210: The MN receives the RRC connection reconfiguration completion message sent by the UE.

Step 211: The MN sends the SN modification acknowledgment message to the SN.

In this embodiment, for an addition request message of the MN, the SN first accepts a request of the MN, and completes configuration based on configuration information in the addition request message, and then the SN sends the SN modification requirement message, to initiate a DRB addition process, to ensure uniqueness of the DRB ID, so that the SN can add the DRB based on a radio resource management policy and a network condition of the SN, to reconfigure a mapping relationship between a QoS flow and the DRB, so that setting of the DRB is more flexible and effective.

Figure 6:
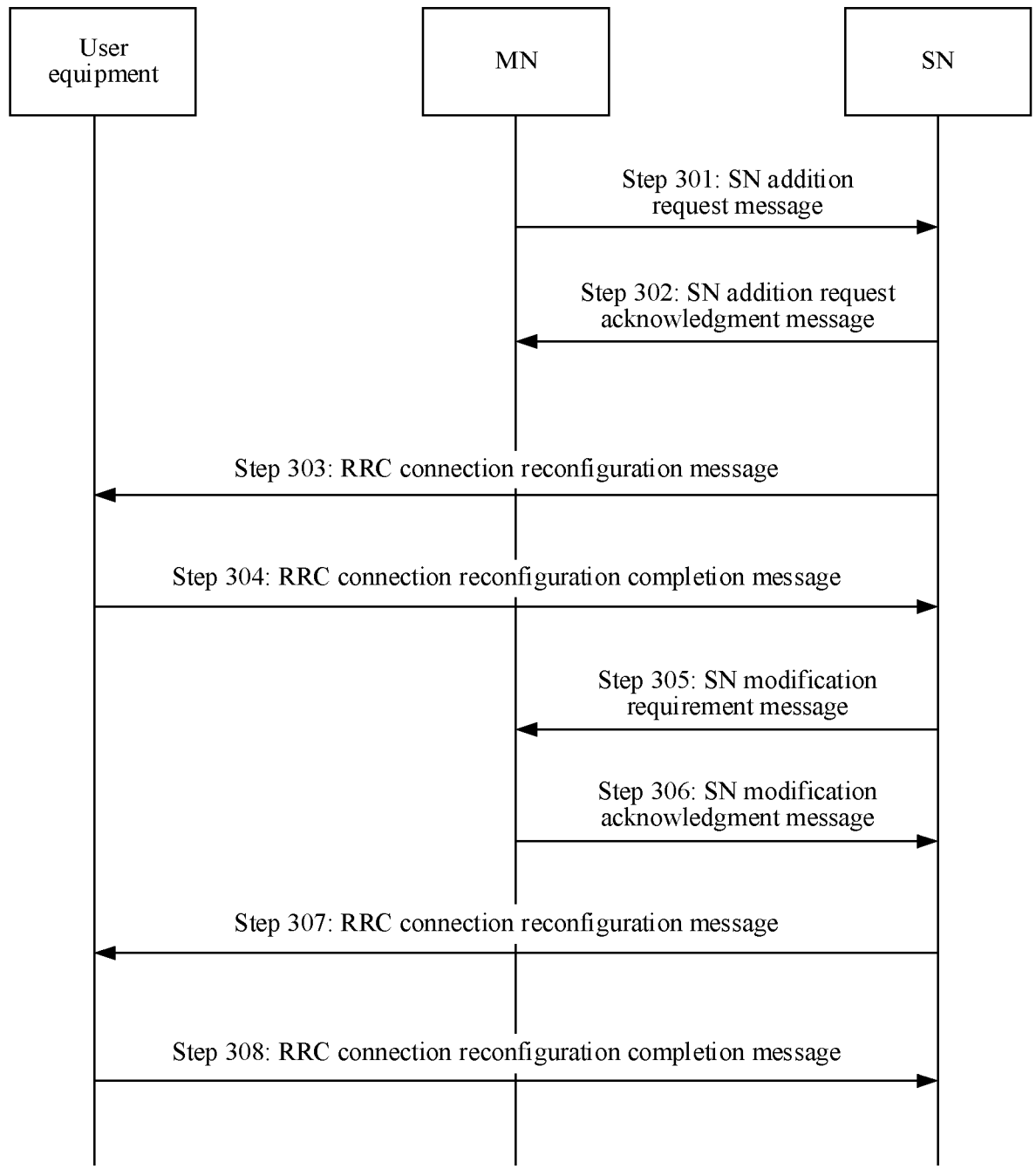
FIG. 6 is a flowchart of still another method for obtaining a DRB identifier according to this application.

FIG. 6 is a flowchart of still another method for obtaining a DRB identifier according to this application. A difference between this embodiment and the embodiment shown in FIG. 5 is that an SN directly sends an RRC connection reconfiguration message to UE. As shown in FIG. 6, the method in this embodiment may include the following steps.

Step 301: The MN sends an SN addition request message to the SN.

Step 302: The SN sends an SN addition request acknowledgment message to the MN.

For specific explanations and descriptions of step 301 and step 302, refer to explanations and descriptions of step 201 and step 202 in the embodiment shown in FIG. 5. Details are not described herein again.

Step 303: The SN sends the RRC connection reconfiguration message to the UE.

The RRC connection reconfiguration message may carry a mapping relationship between an uplink QoS flow and a DRB and related configuration information of the DRB, that is, a DRB ID and configuration information of a PDCP, RLC, and a logical channel of the DRB.

Step 304: The SN receives an RRC connection reconfiguration completion message sent by the UE.

Step 305: The SN sends an SN modification requirement message to the MN.

In this step, the SN modification requirement message may be a specific implementation of the first message in the embodiment shown in FIG. 3.

Step 306: The MN sends an SN modification acknowledgment message to the SN.

In this step, the SN modification acknowledgment message may be a specific implementation of the second message in the embodiment shown in FIG. 3.

For specific explanations and descriptions of step 305 and step 306, refer to step 206 and step 207 of the embodiment shown in FIG. 5. Details are not described herein again.

Step 307: The SN sends the RRC connection reconfiguration message to the UE.

The RRC connection reconfiguration message includes first information.

For specific explanations and descriptions of the first information, refer to explanations and descriptions of the embodiment shown in FIG. 3. Details are not described herein again.

Step 308: The UE sends the RRC connection reconfiguration completion message to the SN.

In this embodiment, for an addition request message of the MN, the SN first accepts a request of the MN, and completes configuration based on configuration information in the addition request message, and then the SN sends the SN modification requirement message, to initiate a DRB addition process, to ensure uniqueness of the DRB ID, so that the SN can add the DRB based on a radio resource management policy and a network condition of the SN, to reconfigure a mapping relationship between a QoS flow and the DRB, so that setting of the DRB is more flexible and effective.

In the embodiments shown in FIG. 5 and FIG. 6, for the addition request message of the MN, the SN always first accepts the SN addition request message sent by the MN, and completes configuration based on the configuration information in the SN addition request message, and then the SN initiates the DRB addition process to the MN, that is, sends the first message. Different from the embodiments shown in FIG. 5 and FIG. 6, in the following two embodiments, for the SN addition request message sent by the MN, the SN may directly initiate the DRB addition process, that is, send the first message. For specific explanations and descriptions, refer to the following embodiments.

Figure 7:
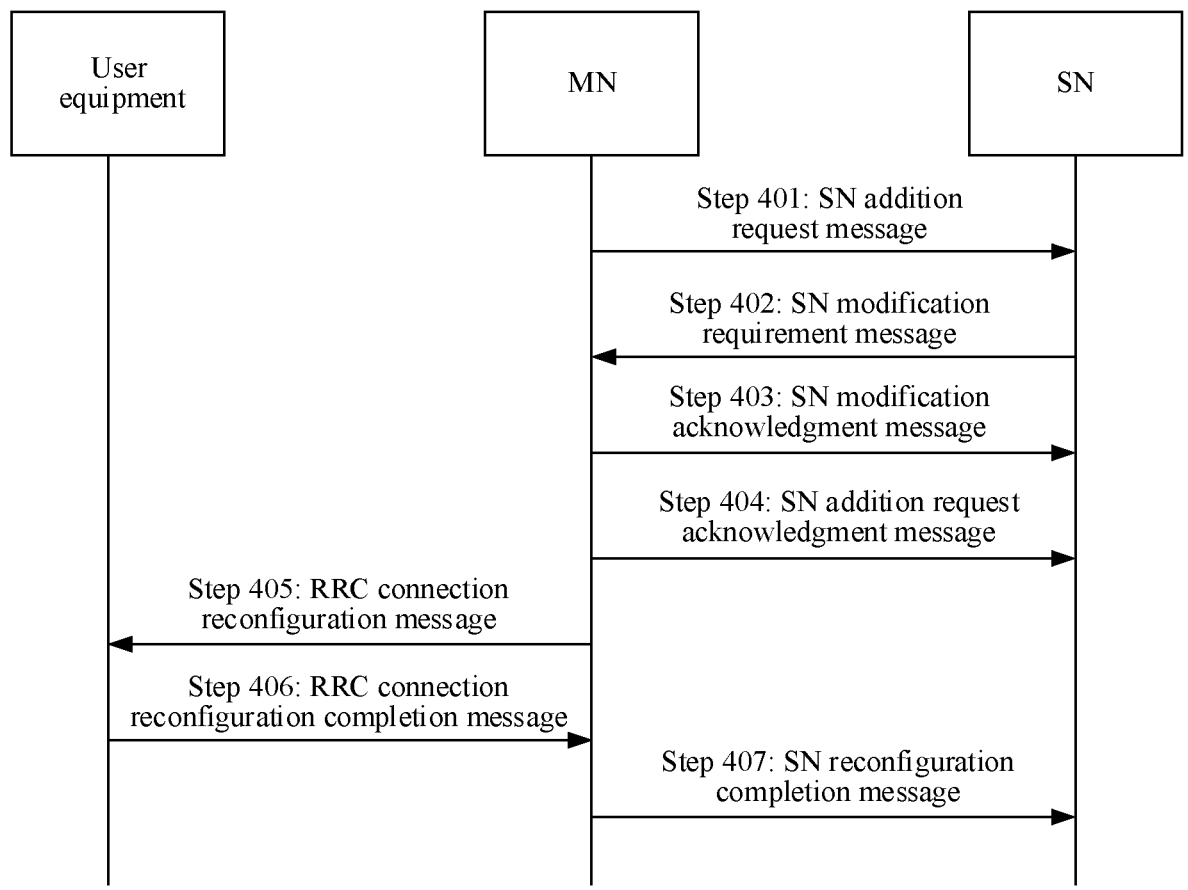
FIG. 7 is a flowchart of still another method for obtaining a DRB identifier according to this application.

FIG. 7 is a flowchart of still another method for obtaining a DRB identifier according to this application. As shown in FIG. 7, the method in this embodiment may include the following steps.

Step 401: An MN sends an SN addition request message to an SN.

For specific explanations and descriptions of step 401, refer to specific explanations and descriptions of step 301. Details are not described herein again.

Step 402: The SN initiates an SN modification process, and sends an SN modification requirement message to the MN.

After the SN receives the SN addition request message sent by the MN, if the SN needs to add the DRB, the SN initiates the SN modification process, and sends the SN modification requirement message to the MN. The SN modification requirement message in this step may be a specific implementation of the first message in the embodiment shown in FIG. 3, in other words, an objective for the SN to initiate the SN modification process is to trigger adding a DRB. More specifically, the step is to request the MN to allocate a DRB ID. For specific explanations and descriptions of the first message, refer to explanations and descriptions of the embodiment shown in FIG. 3. Details are not described herein again. In other words, the SN may determine, based on configuration information in the SN addition request message, that the DRB needs to be added.

Step 403: The MN sends an SN modification acknowledgment message to the SN.

In this step, the SN modification acknowledgment message may be a specific implementation of the second message in the embodiment shown in FIG. 3. For specific explanations and descriptions of the second message, refer to explanations and descriptions of the embodiment shown in FIG. 3. Details are not described herein again.

Step 404: The SN sends an SN addition request acknowledgment message to the MN.

For specific explanations and descriptions of step 404, refer to specific explanations and descriptions of step 202. Details are not described herein again. It should be noted that, the SN addition request acknowledgment message in step 404 includes configuration information of an added DRB.

Step 405: The MN sends an RRC connection reconfiguration message to UE.

Step 406: The MN receives an RRC connection reconfiguration completion message sent by the UE.

Step 407: The MN sends an SN reconfiguration completion message to the SN.

In this embodiment, for an addition request message of the MN, the SN determines, based on the configuration information in the addition request message, that the DRB needs to be added, and the SN sends the SN modification requirement message, to initiate a DRB addition process, to ensure uniqueness of the DRB ID, so that the SN can add the DRB based on a radio resource management policy and a network condition of the SN, to reconfigure a mapping relationship between a QoS flow and the DRB, so that setting of the DRB is more flexible and effective.

Figure 8:
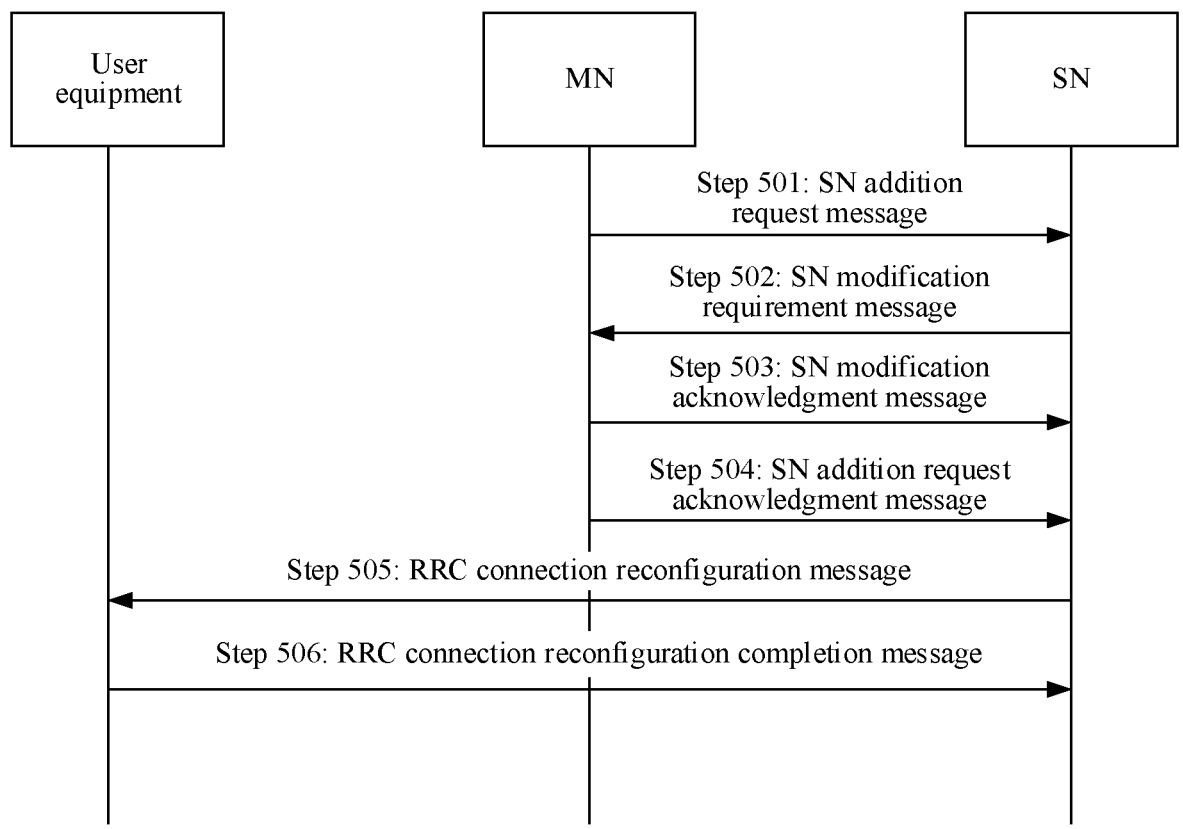
FIG. 8 is a flowchart of yet another method for obtaining a DRB identifier according to this application.

FIG. 8 is a flowchart of yet another method for obtaining a DRB identifier according to this application. A difference between this embodiment and the embodiment shown in FIG. 7 is that an SN directly sends an RRC connection reconfiguration message to UE. As shown in FIG. 8, the method in this embodiment may include the following steps.

Step 501: An MN sends an SN addition request message to the SN.

For specific explanations and descriptions of step 501, refer to specific explanations and descriptions of step 301. Details are not described herein again.

Step 502: The SN initiates an SN modification process, and the SN sends an SN modification requirement message to the MN.

After the SN receives an addition request message sent by the MN, if the SN needs to add the DRB, the SN initiates the SN modification process, and sends the SN modification requirement message to the MN. The SN modification requirement message in this step may be a specific implementation of the first message in the embodiment shown in FIG. 3, in other words, an objective for the SN to initiate the SN modification process is to trigger adding the DRB. More specifically, the step is to request the MN to allocate a DRB ID. For specific explanations and descriptions of the first message, refer to explanations and descriptions of the embodiment shown in FIG. 3. Details are not described herein again.

Step 503: The MN sends an SN modification acknowledgment message to the SN.

In this step, the SN modification acknowledgment message may be a specific implementation of the second message in the embodiment shown in FIG. 3. For specific explanations and descriptions of the second message, refer to explanations and descriptions of the embodiment shown in FIG. 3. Details are not described herein again.

Step 504: The SN sends an SN addition request acknowledgment message to the MN.

For specific explanations and descriptions of step 504, refer to specific explanations and descriptions of step 404. Details are not described herein again.

Step 505: The SN sends the RRC connection reconfiguration message to the UE.

Step 506: The SN receives an RRC connection reconfiguration completion message sent by the UE.

For specific explanations and descriptions of step 505 and step 506, refer to step 307 and step 308. Details are not described herein again.

In this embodiment, for an addition request message of the MN, the SN determines, based on configuration information in the addition request message, that the DRB needs to be added, and the SN sends the SN modification requirement message, to initiate a DRB addition process, to ensure uniqueness of the DRB ID, so that the SN can add the DRB based on a radio resource management policy and a network condition of the SN, to reconfigure a mapping relationship between a QoS flow and the DRB, so that setting of the DRB is more flexible and effective.

Figure 9:
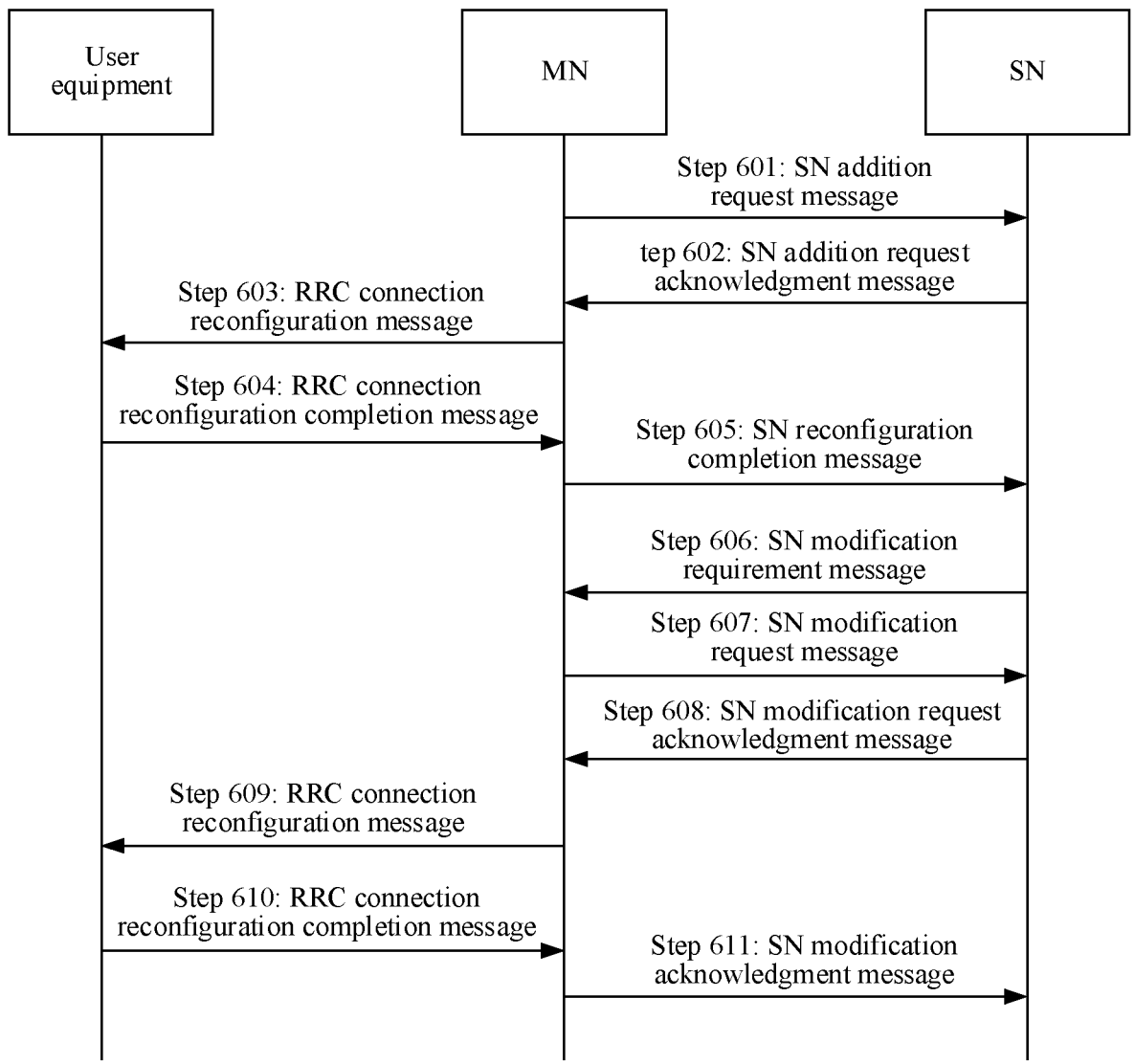
FIG. 9 is a flowchart of yet another method for obtaining a DRB identifier according to this application.

FIG. 9 is a flowchart of yet another method for obtaining a DRB identifier according to this application. A difference between this embodiment and the embodiment shown in FIG. 8 is that an MN sends a DRB ID of an added DRB to an SN by using an SN modification request message. As shown in FIG. 9, the method in this embodiment may include the following steps.

Step 601: The MN sends an SN addition request message to the SN.

Step 602: The SN sends an SN addition request acknowledgment message to the MN.

Step 603: The MN sends an RRC connection reconfiguration message to UE.

Step 604: The MN receives an RRC connection reconfiguration completion message sent by the UE.

Step 605: The MN sends an SN reconfiguration completion message to the SN.

Step 606: The SN initiates an SN modification process, and the SN sends an SN modification requirement message to the MN.

If the SN needs to add a DRB, the SN initiates the SN modification process, and sends the SN modification requirement message to the MN. The SN modification requirement message in this step may be a specific implementation of the first message in the embodiment shown in FIG. 3, in other words, an objective for the SN to initiate the SN modification process is to trigger adding a DRB. More specifically, the step is to request the MN to allocate the DRB ID.

Step 607: The MN sends the SN modification request message to the SN.

In this step, the SN modification request message may be a specific implementation of the second message in the embodiment shown in FIG. 3. For specific explanations and descriptions of the second message, refer to explanations and descriptions of the embodiment shown in FIG. 3. Details are not described herein again. In other words, the DRB ID of the added DRB is sent to the SN by using the SN modification request message.

Step 608: The SN sends an SN modification request acknowledgment message to the MN.

In this step, the SN modification request acknowledgment message may be a specific implementation of the fifth message in the embodiment shown in FIG. 3. For specific explanations and descriptions of the second message, refer to explanations and descriptions of the embodiment shown in FIG. 3. Details are not described herein again.

Step 609: The MN sends the RRC connection reconfiguration message to the UE. The RRC connection reconfiguration message includes first information.

For specific explanations and descriptions of the first information, refer to explanations and descriptions of the embodiment shown in FIG. 3. Details are not described herein again.

Step 610: The MN receives the RRC connection reconfiguration completion message sent by the UE.

Step 611: The MN sends an SN modification acknowledgment message to the SN.

In this embodiment, for an addition request message of the MN, the SN first accepts a request of the MN, and completes configuration based on configuration information in the addition request message, and then the SN sends the SN modification requirement message, to initiate a DRB addition process, to ensure uniqueness of the DRB ID, so that the SN can add the DRB based on a radio resource management policy and a network condition of the SN, to reconfigure a mapping relationship between a QoS flow and the DRB, so that setting of the DRB is more flexible and effective.

Figure 10:
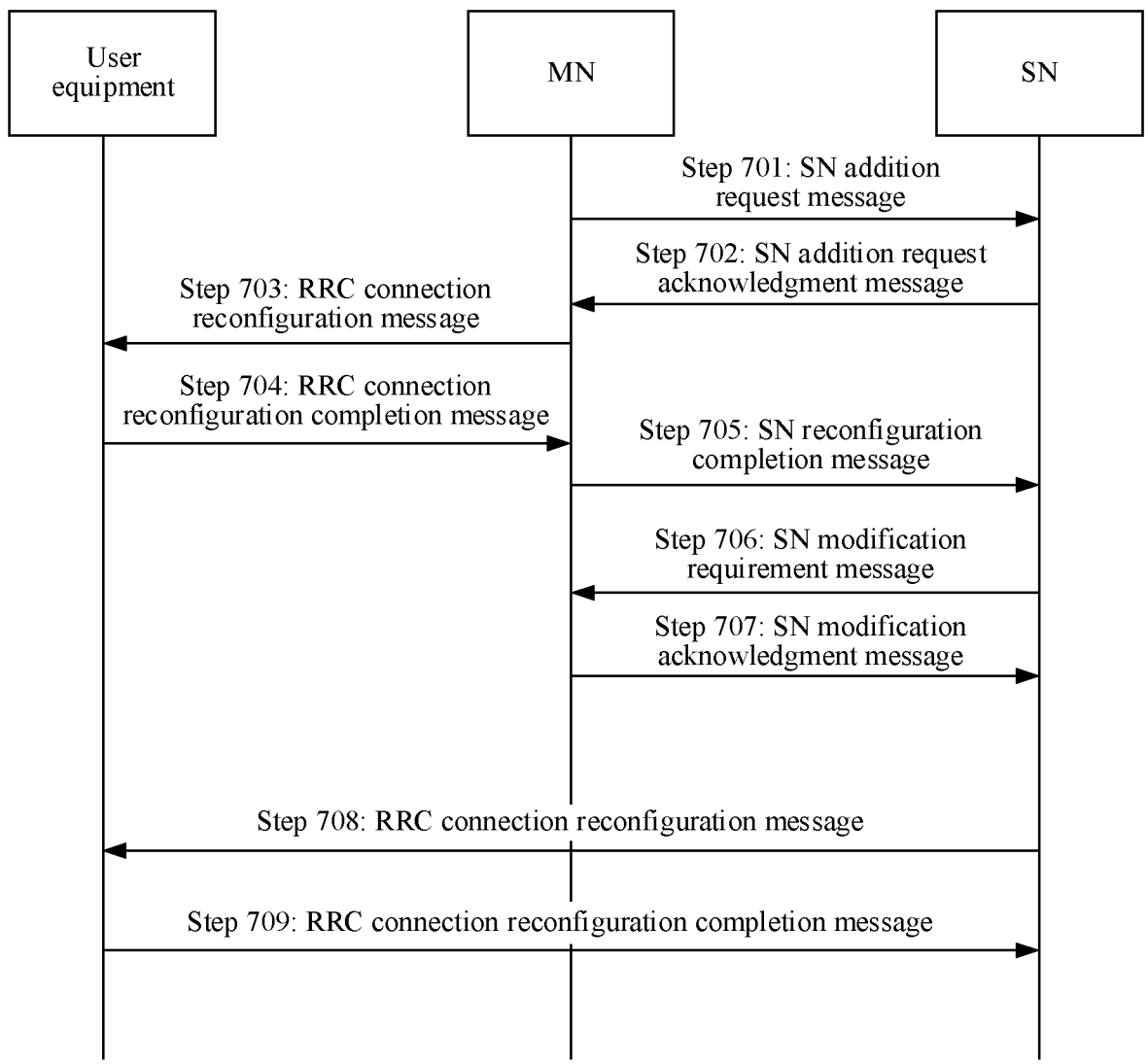
FIG. 10 is a flowchart of yet another method for obtaining a DRB identifier according to this application.

FIG. 10 is a flowchart of yet another method for obtaining a DRB identifier according to this application. As shown in FIG. 10, the method in this embodiment may include the following steps.

Step 701: An MN sends an SN addition request message to an SN.

Step 702: The SN sends an SN addition request acknowledgment message to the MN.

Step 703: The MN sends an RRC connection reconfiguration message to UE.

Step 704: The MN receives an RRC connection reconfiguration completion message sent by the UE.

Step 705: The MN sends an SN reconfiguration completion message to the SN.

Step 706: The SN initiates an SN modification process, and the SN sends an SN modification requirement message to the MN.

If the SN needs to add a DRB, the SN initiates the SN modification process, and sends a first message to the MN, in other words, an objective for the SN to initiate the SN modification process is to trigger adding the DRB. More specifically, the step is to request the MN to allocate a DRB ID. In this step, the SN modification requirement message may be a specific implementation of the first message in the embodiment shown in FIG. 3.

Step 707: The MN sends an SN modification acknowledgment message to the SN.

In this step, the SN modification acknowledgment message may be a specific implementation of the second message in the embodiment shown in FIG. 3.

For specific explanations and descriptions of step 701 to step 708, refer to specific explanations and descriptions of step 201 to step 207 in the embodiment shown in FIG. 5. Details are not described herein again.

Step 708: The SN sends the RRC connection reconfiguration message to the UE. The RRC connection reconfiguration message includes first information.

For specific explanations and descriptions of the first information, refer to explanations and descriptions of the embodiment shown in FIG. 3. Details are not described herein again.

Step 709: The SN receives the RRC connection reconfiguration completion message sent by the UE.

In this embodiment, for an addition request message of the MN, the SN first accepts a request of the MN, and completes configuration based on configuration information in the addition request message, and then the SN sends the SN modification requirement message, to initiate a DRB addition process, to ensure uniqueness of the DRB ID, so that the SN can add the DRB based on a radio resource management policy and a network condition of the SN, to reconfigure a mapping relationship between a QoS flow and the DRB, so that setting of the DRB is more flexible and effective.

Figure 11:
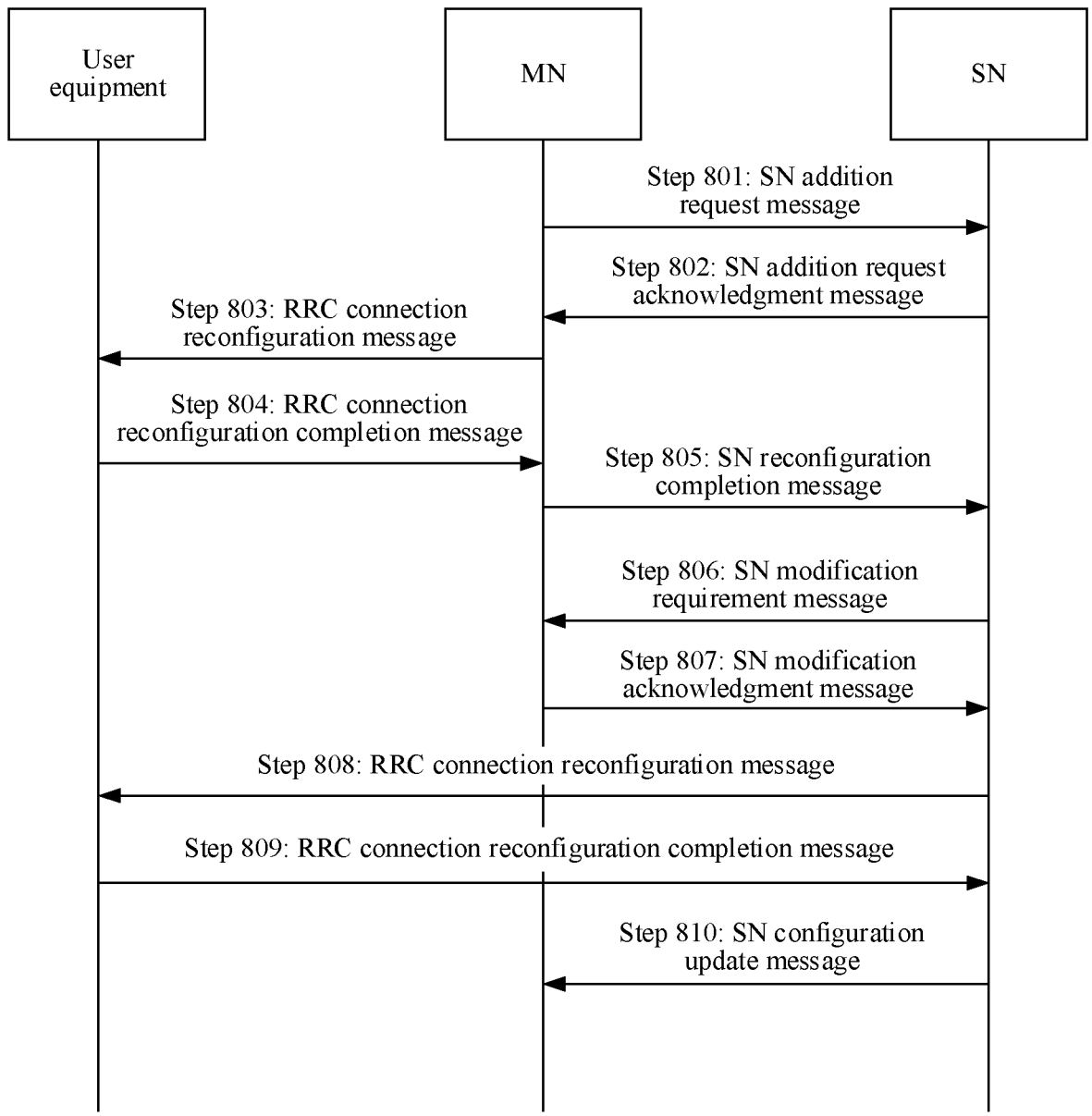
FIG. 11 is a flowchart of yet another method for obtaining a DRB identifier according to this application.

FIG. 11 is a flowchart of yet another method for obtaining a DRB identifier according to this application. As shown in FIG. 11, the method in this embodiment may include the following steps.

Step 801: An MN sends an SN addition request message to an SN.

The addition request message includes a QoS flow ID of a QoS flow that the MN requests the SN to transmit and a corresponding QoS parameter. In addition, an RRC Container in the addition request message may further include a mapping relationship that is between the QoS flow ID of the QoS flow that is transferred to the SN for transmission and the DRB ID and that is configured by the MN.

Step 802: The SN sends an SN addition request acknowledgment message to the MN.

In this embodiment, after receiving the SN addition request message sent by the MN, the SN performs configuration based on the mapping relationship that is between the QoS flow ID and the DRB ID and that is provided by the MN. The addition request acknowledgment message includes an RRC Container. The RRC Container includes a radio resource configuration and a radio bearer configuration of the SN.

Step 803: The MN sends an RRC connection reconfiguration message to UE.

The MN sends, by using the RRC connection reconfiguration message to the UE, information in the RRC Container in the addition request acknowledgment message replied by the SN.

Step 804: The MN receives an RRC connection reconfiguration completion message sent by the UE.

Step 805: The MN sends an SN reconfiguration completion message to the SN.

Step 806: The SN initiates an SN modification process, and the SN sends an SN modification requirement message to the MN.

Step 807: The MN sends an SN modification acknowledgment message to the SN.

For specific explanations and descriptions of step 806 and step 807, refer to step 706 and step 707. Details are not described herein again.

Step 808: The SN sends the RRC connection reconfiguration message to the UE.

After the SN receives the modification acknowledgment message sent by the MN, the SN determines a selected DRB ID. The SN sends the RRC connection reconfiguration message to the UE, and the RRC connection reconfiguration message includes configuration information of an updated mapping relationship between a QoS flow transmitted by the SN.

Step 809: The SN receives the RRC connection reconfiguration completion message sent by the UE.

Step 810: The SN sends an SN configuration update message to the MN.

The SN configuration update message includes a remaining available DRB ID, or the DRB ID selected by the SN, or the updated mapping relationship between the QoS flow and the DRB.

In this embodiment, a DRB addition process can ensure uniqueness of the DRB ID, so that the SN can add the DRB based on a radio resource management policy and a network condition of the SN, to reconfigure a mapping relationship between the QoS flow and the DRB, so that setting of the DRB is more flexible and effective.

Figure 12:
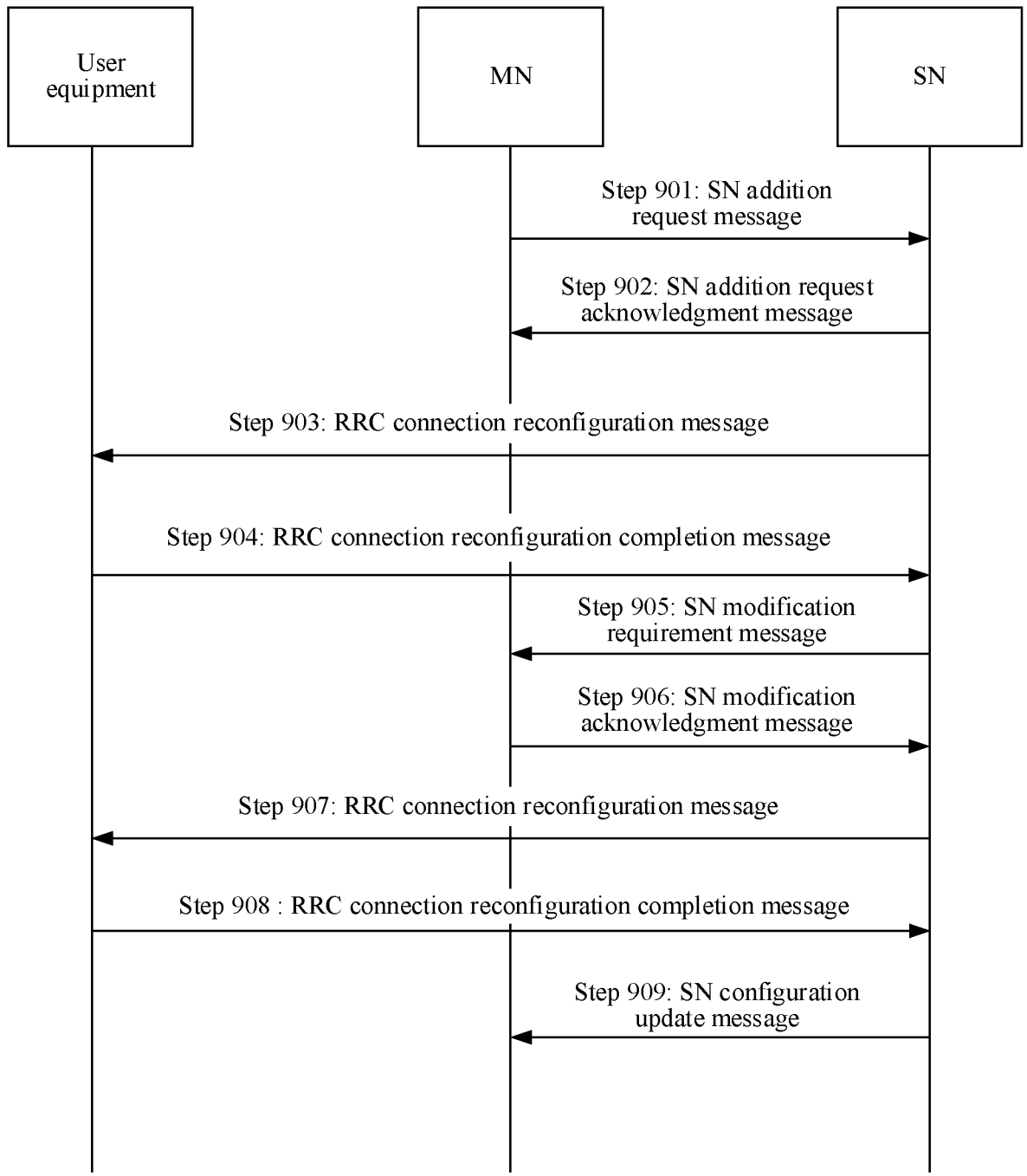
FIG. 12 is a flowchart of yet another method for obtaining a DRB identifier according to this application.

FIG. 12 is a flowchart of yet another method for obtaining a DRB identifier according to this application. As shown in FIG. 12, the method in this embodiment may include the following steps.

Step 901: An MN sends an SN addition request message to an SN.

The addition request message includes a QoS flow ID of a QoS flow that the MN requests the SN to transmit and a corresponding QoS parameter. In addition, an RRC Container in the addition request message further includes an available DRB ID.

Step 902: The SN sends an SN addition request acknowledgment message to the MN.

If the SN accepts the addition request message, the SN determines, based on the available DRB ID provided by the MN, a selected DRB ID and a mapping relationship between the DRB ID and the QoS flow ID of the QoS flow that the MN requests to transmit by using the SN. The SN replies the addition request acknowledgment message, and the addition request acknowledgment message includes a remaining available DRB ID or a DRB ID occupied by the SN.

Step 903: The SN sends an RRC connection reconfiguration message to UE.

The RRC connection reconfiguration message includes configuration information of an updated mapping relationship between a QoS flow transmitted by the SN.

Step 904: The SN receives an RRC connection reconfiguration completion message sent by the UE.

Step 905: The SN initiates an SN modification process, and the SN sends an SN modification requirement message to the MN.

Step 906: The MN sends an SN modification acknowledgment message to the SN.

For specific explanations and descriptions of step 906 to step 907, refer to step 706 and step 707. Details are not described herein again.

Step 907: The SN sends the RRC connection reconfiguration message to the UE.

After the SN receives the modification acknowledgment message sent by the MN, the SN determines the selected DRB ID. The SN sends the RRC connection reconfiguration message to the UE, and the RRC connection reconfiguration message includes the configuration information of the updated mapping relationship between the QoS flow transmitted by the SN.

Step 908: The SN receives the RRC connection reconfiguration completion message sent by the UE.

Step 909: The SN sends an SN configuration update message to the MN.

The SN configuration update message includes the remaining available DRB ID, or the DRB ID selected by the SN, or the updated mapping relationship between the QoS flow and the DRB.

In this embodiment, a DRB addition process can ensure uniqueness of the DRB ID, so that the SN can add the DRB based on a radio resource management policy and a network condition of the SN, to reconfigure a mapping relationship between a QoS flow and the DRB, so that setting of the DRB is more flexible and effective.

Figure 13:
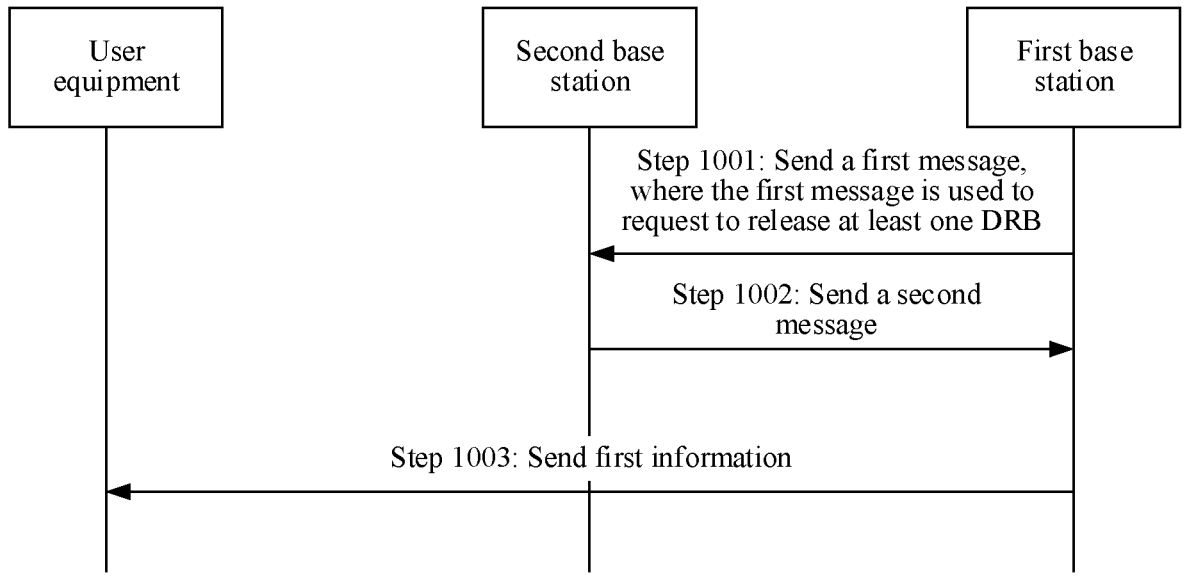
FIG. 13 is a flowchart of yet another method for obtaining a DRB identifier according to this application.

FIG. 13 is a flowchart of yet another method for obtaining a DRB identifier according to this application. As shown in FIG. 13, this embodiment includes user equipment, a first base station, and a second base station. A difference between this embodiment and the foregoing embodiments is that the first base station in this embodiment requests to release a DRB according to a requirement of the first base station. The method in this embodiment may include the following steps.

Step 1001: The first base station sends a first message to the second base station, and the second base station receives the first message sent by the first base station, where the first message is used to request to release at least one DRB.

When determining that the DRB needs to be reduced, the first base station may send the first message to the second base station to request to release the DRB. The second base station receives the first message, and learns of an identifier of the DRB that the first base station needs to release.

The first message may specifically include any one or more of the following: an identifier of at least one DRB that requests to be released; or a mapping relationship that is between a DRB and a QoS flow and that is configured by the first base station.

Step 1002: The first base station receives a second message sent by the second base station, and the second base station receives the second message sent by the first base station, where the second message is used to acknowledge reception of the first message to the first base station.

Step 1003: The first base station sends first information to the user equipment, and the user equipment receives the first information sent by the first base station, where the first information includes the identifier of the at least one DRB.

The DRB identifier included in the first information is an identifier of a released DRB.

It may be understood that, the second message is used to feed back an acknowledgment acceptance release request to the first base station, and the second base station may further send a release rejection message, to reject a release request of the first base station.

In this embodiment, the first base station sends the first message to the second base station to request to release the DRB, the second base station feeds back the second message to the first base station, the first base station may determine, based on the second message, the DRB that may be released, and the first base station sends an identifier of the released DRB to the user equipment, to ensure uniqueness of the DRB ID, so that the first base station can add the DRB based on a radio resource management policy and a network condition of the first base station, to reconfigure a mapping relationship between a QoS flow and the DRB, so that setting of the DRB is more flexible and effective.

Figure 14:
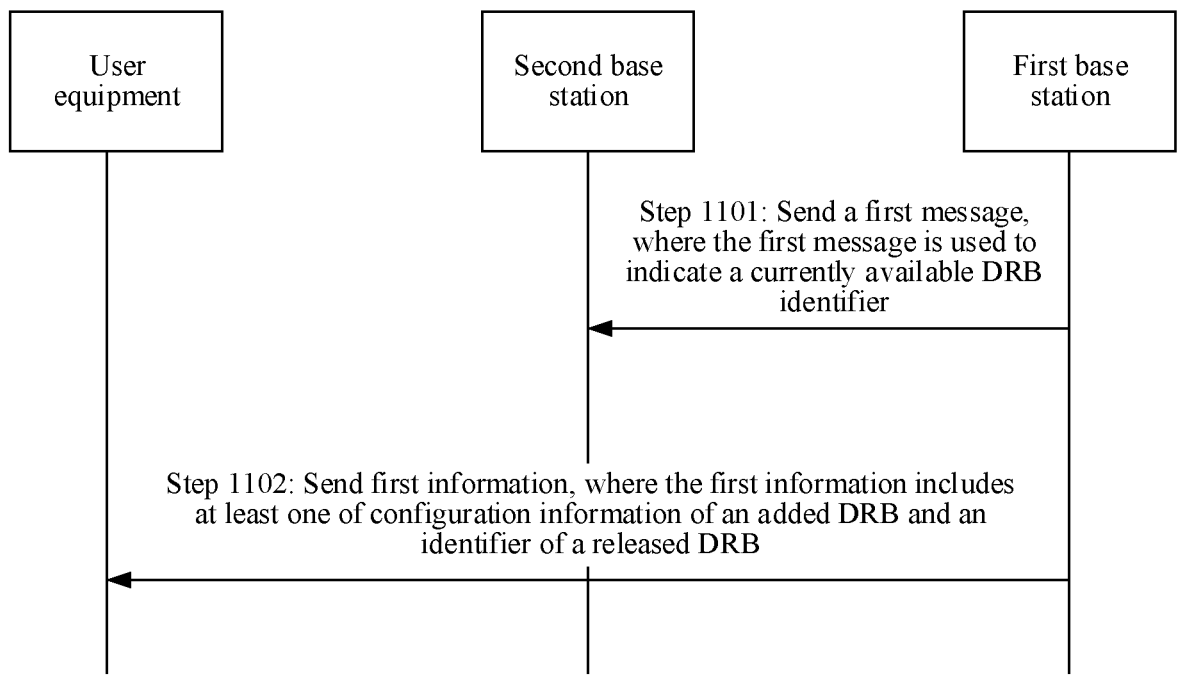
FIG. 14 is a flowchart of yet another method for obtaining a DRB identifier according to this application.

FIG. 14 is a flowchart of yet another method for obtaining a DRB identifier according to this application. As shown in FIG. 14, this embodiment includes user equipment, a first base station, and a second base station, and the method in this embodiment may include the following steps.

Step 1101: The first base station sends a first message to the second base station, and the second base station receives the first message sent by the first base station, where the first message is used to indicate a currently available DRB identifier.

Specifically, after updating a DRB identifier, to generate the currently available DRB identifier, the first base station sends the first message, where a reason for updating the DRB identifier includes at least one of adding a DRB and releasing a DRB.

When the reason for updating the DRB identifier includes adding a DRB, the currently available DRB identifier does not include an identifier of the added DRB.

When the reason for updating the DRB identifier includes releasing a DRB, the currently available DRB identifier includes an identifier of the released DRB.

That is, the first base station needs to inform the second base station by using the first message after updating the DRB identifier.

Step 1102: The first base station sends first information to the user equipment, and the user equipment receives the first information sent by the first base station, where the first information may include at least one of configuration information of the added DRB and the identifier of the released DRB, and the configuration information of the added DRB includes the identifier of the added DRB.

The configuration information of the added DRB may further include other configuration information, for example, configurations of a PDCP entity, an RLC entity, and a logical channel that correspond to the DRB.

Optionally, the first information may further include information about a mapping relationship between an uplink QoS flow and a DRB.

In one implementation, the first base station is a secondary eNB, and the second base station is a master eNB.

Alternatively, in another implementation, the first base station is a master eNB, and the second base station is a secondary eNB.

Optically, the first message may include any one or more of the following information: the currently available DRB identifier; an identifier of a DRB occupied by the first base station; an identifier of a DRB released by the first base station; or a mapping relationship that is between a QoS flow and a DRB and that is configured by the first base station.

Specifically, when the first message includes the currently available DRB identifier, the second base station obtains the currently available DRB identifier based on the first message.

When the first message includes the identifier of the DRB occupied by the first base station, the second base station determines the currently available DRB identifier based on the identifier of the DRB occupied by the first base station and an available DRB identifier maintained by the second base station.

When the first message includes the identifier of the DRB released by the first base station, the second base station determines the currently available DRB identifier based on the identifier of the DRB released by the first base station and the available DRB identifier maintained by the second base station.

When the first message includes the mapping relationship that is between the QoS flow and the DRB and that is configured by the first base station, the second base station determines, based on the mapping relationship that is between the QoS flow and the DRB and that is configured by the first base station, the identifier of the DRB occupied by the first base station, and determines the currently available DRB identifier based on the identifier of the DRB occupied by the first base station and the available DRB identifier maintained by the second base station.

Optionally, before the foregoing step 801 or after the foregoing step 802, the method may further include: receiving, by the first base station, a second message sent by the second base station; sending, by the second base station, the second message to the first base station, where the second message is used to indicate the available DRB identifier; and performing, by the first base station, DRB identifier update on the available DRB identifier, to generate the currently available DRB identifier.

Specifically, the second base station maintains the available DRB identifier, and the second base station indicates the available DRB identifier to the first base station by using the second message. The first base station selects a DRB identifier from the available DRB identifier for the added DRB, updates the DRB identifier maintained by the first base station, to generate the currently available DRB identifier, and informs, by using the first message, the second base station of a result after update.

Optically, the second message includes any one or more of the following information: the available DRB identifier; an identifier of a DRB occupied by the second base station; an identifier of a DRB released by the second base station; or a mapping relationship that is between a QoS flow and a DRB and that is configured by the second base station.

Specifically, both the first base station and the second base station maintain the available DRB identifier, and one party needs to inform the other party of a result after update after a usage status of the DRB identifier of the party is updated. A manner that the party informs the other party of the result after update may be directly informing of the available DRB identifier, or informing the other party of the identifier of the DRB occupied or released by the party, or a mapping relationship that is between the QoS flow and the DRB and that is configured by the party, so that the other party determines, based on the available DRB identifier maintained by the other party and the foregoing information, the result after update.

Optionally, when the first base station is a secondary eNB, and the second base station is a master eNB, the method may further include: receiving, by the first base station, a third message sent by the second base station, where the third message is used to request to transfer at least one QoS flow to the first base station, or used to request the first base station to add at least one QoS flow, or used to request to transfer at least one DRB to the first base station, or used to request the first base station to add at least one DRB.

The third message includes any one or more of the following information: an identifier of the at least one QoS flow that is transferred to the first base station and a QoS parameter of the at least one QoS flow; a mapping relationship between the at least one QoS flow and the DRB; indication information of a transfer type; or an available DRB identifier.

The transfer type includes at least one of QoS flow transfer and DRB transfer.

The QoS flow transfer is transfer of QoS flows performed by using the QoS flow as granularity, in other words, transferred QoS flows are some of QoS flows in at least one DRB configured by the second base station, rather than all QoS flows in the at least one DRB.

The DRB transfer is transfer of QoS flows performed by using the DRB as granularity, in other words, transferred QoS flows are all QoS flows in the at least one DRB configured by the second base station.

After the first base station accepts the foregoing transfer, if it is determined that the DRB needs to be added to reconfigure mapping between the QoS flow and the DRB, subsequent step 801 to step 802 may be performed.

The mapping relationship between the at least one QoS flow and the DRB and the indication information of the transfer type are included in a radio resource control information container (RRC Container), and the radio resource control information container (RRC Container) is included in the third message.

In one implementation of the foregoing step 802, the first base station sends a radio resource control reconfiguration message to the user equipment, where the radio resource control reconfiguration message includes the first information.

In another implementation of the foregoing step 803, the first base station sends a fourth message to the second base station, where the fourth message includes the first information, and the fourth message is used by the second base station to obtain the first information and add the first information in the radio resource control reconfiguration message sent to the user equipment.

Optionally, the fourth message may further include second information. The second information is used to indicate that a reason for sending the fourth message is to change a mapping relationship between the QoS flow and the DRB. Specifically, the fourth message includes the second information and the RRC Container, and the RRC Container includes the first information. Therefore, when receiving the fourth message, the second base station may first view the second information. That the fourth message carries the second information indicates that the first base station modifies the mapping relationship between the QoS flow and the DRB. Therefore, the second base station then obtains the first information from the RRC Container based on the first information. However, if the fourth message does not carry the second information, the second base station may not perform the step of obtaining information from the RRC Container, but directly transparently transmit the RRC Container to the UE.

It should be noted that, the fourth message and the first message in this embodiment may be two independent messages, or may be a same message, and may be flexibly set according to a requirement. The third message and the second message in this embodiment may be two independent messages, or may be a same message, and may be flexibly set according to the requirement.

In this embodiment, the first base station sends the first message to the second base station to indicate the currently available DRB identifier, and the first base station sends the first information to the user equipment, where the first information may include at least one of the configuration information of the added DRB and the identifier of the released DRB, to ensure uniqueness of the DRB ID, so that the first base station can add the DRB based on a radio resource management policy and a network condition of the first base station, to reconfigure the mapping relationship between the QoS flow and the DRB, so that setting of the DRB is more flexible and effective.

The following two specific embodiments are used to specifically explain and describe the embodiment shown in FIG. 14.

Figure 15:
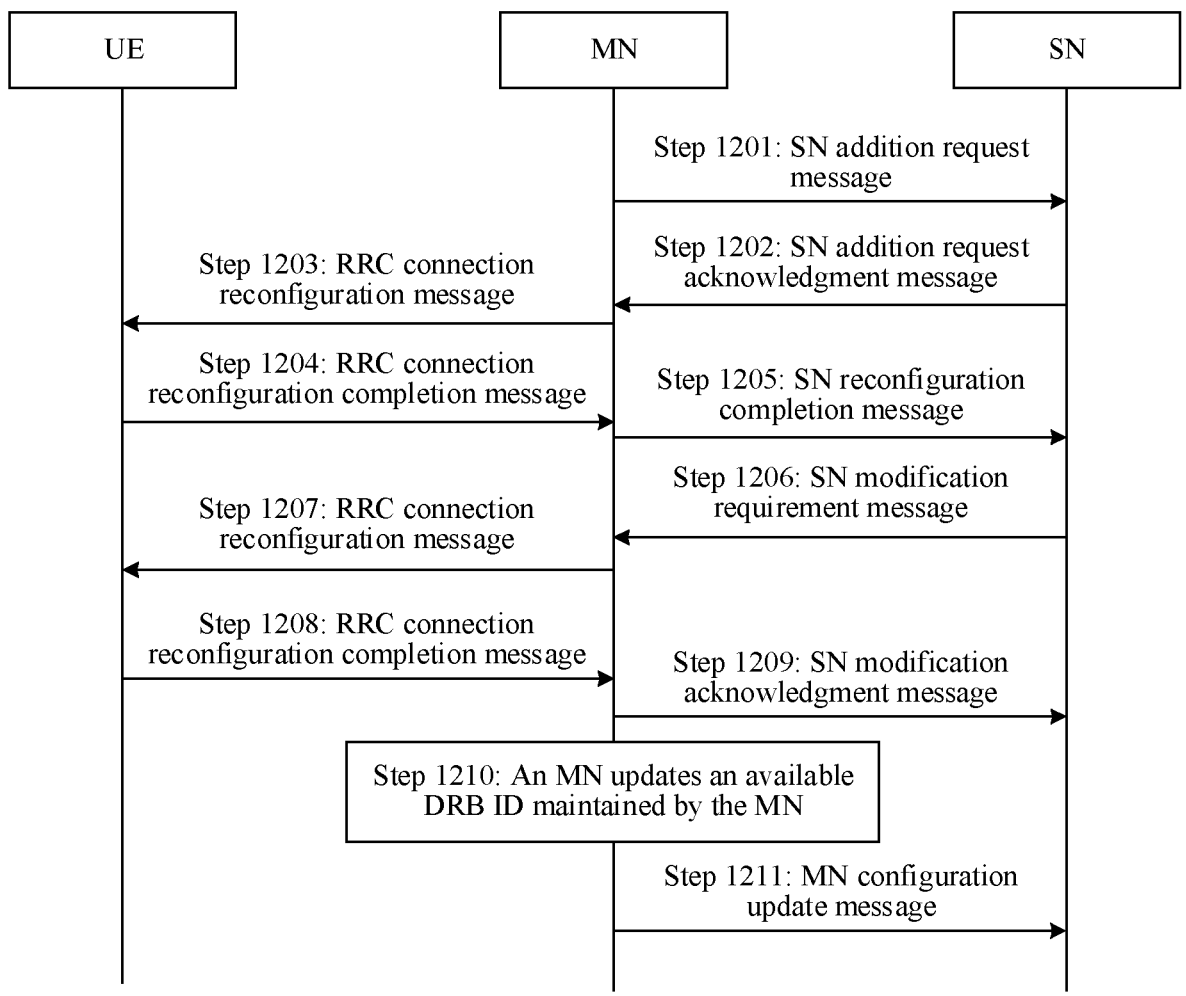
FIG. 15 is a flowchart of yet another method for obtaining a DRB identifier according to this application.

FIG. 15 is a flowchart of yet another method for obtaining a DRB identifier according to this application. As shown in FIG. 15, this embodiment includes UE, an MN, and an SN, and the method in this embodiment may include the following steps.

Step 1201: The MN sends an SN addition request message to the SN.

Specifically, the MN determines to request the SN to transmit some of QoS flows of the UE, and may send the SN addition request message to the SN. The SN addition request message may include (1) an identifier of a QoS flow that the MN requests the SN to transmit and a corresponding QoS parameter, and (2) a currently available DRB ID.

Optionally, the SN addition request message may further include (3) a DRB ID of at least one QoS flow that the MN allocates to be transferred by the SN to the SN for transmission, and a mapping relationship between a QoS flow ID and the DRB ID.

(2) The currently available DRB ID may be carried in an RRC Container. If the addition request message includes content (3), the content (3) may be further included in an RRC Container.

Step 1202: If the SN accepts an addition request, the SN replies an SN addition request acknowledgment message.

In this embodiment, after the SN receives the SN addition request message sent by the MN, if the addition request message includes the foregoing content (3), the SN performs configuration based on the mapping relationship that is between the QoS flow ID and the DRB ID and that is provided by the MN. Otherwise, the SN selects the DRB ID based on the foregoing content (1) and (2), and determines the mapping relationship between the DRB ID and the QoS flow ID. The addition request acknowledgment message may include a QoS flow ID of a QoS flow that the SN agrees to accept. The addition request acknowledgment message may further include an RRC Container. The RRC Container includes a radio resource configuration information and a radio bearer configuration information of the SN, and a mapping relationship between a DRB and the QoS flow.

Step 1203: The MN sends an RRC connection reconfiguration message to the UE, where the RRC connection reconfiguration message includes information in the RRC Container in the addition request acknowledgment message replied by the SN.

Step 1204: The MN receives an RRC connection reconfiguration completion message sent by the UE.

Step 1205: The MN sends an SN reconfiguration completion message to the SN. The SN reconfiguration completion message is an Xn interface message or an X2 interface message between the MN and the SN.

Step 1206: The SN sends an SN modification requirement message to the MN. The modification request message is used by the SN to initiate a DRB modification process.

The modification requirement message is the first message in the embodiment shown in FIG. 10.

Specifically, when the SN reconfigures the mapping relationship that is between the QoS flow and the DRB and that is born by the SN and needs to add a DRB or release a DRB, the SN initiates an SN modification process, and sends the modification request message to the MN. If the DRB needs to be added, before the SN initiates the SN modification process, the SN selects a DRB ID based on an available DRB ID provided by the MN, and determines a new mapping relationship between the QoS flow and the DRB.

For specific information included in the modification requirement message, refer to explanations and descriptions of specific information of the first message in the embodiment shown in FIG. 10. Details are not described herein again.

Optionally, the SN may further add a reason for sending the modification request message in the modification request message, and specifically, reason information of the modification request message may be set as QoS flow remapping, in other words, the mapping relationship between the QoS flow and the DRB is changed, to inform the MN of the reason for initiating the modification process. The MN may determine a remaining available DRB ID based on the DRB ID included in the modification request message, and determine whether the DRB ID allocated by the SN conflicts with the DRB ID allocated by the MN.

Step 1207: If the DRB ID allocated by the MN does not conflict with the DRB ID allocated by the SN, the MN sends the RRC connection reconfiguration message to the UE. The RRC connection reconfiguration message carries information in the RRC Container in the modification request message sent by the SN.

It may be understood that, if the DRB ID allocated by the MN conflicts with the DRB ID allocated by the SN, the MN sends a modification rejection message to the SN.

Step 1208: The MN receives the RRC connection reconfiguration completion message sent by the UE.

Step 1209: The MN sends an SN modification acknowledgment message to the SN. The SN modification acknowledgment message is an Xn interface message or an X2 interface message between the MN and the SN.

Step 1210: The MN updates an available DRB ID maintained by the MN.

Step 1211: The MN sends an MN configuration update message to the SN. The MN configuration update message includes the available DRB ID updated by the MN.

When a quantity of the DRBs configured by the MN changes, the MN sends the updated available DRB ID to the SN by using the configuration update message. Reasons for change of the quantity of DRBs include that the MN adds a DRB and the MN releases a DRB.

The configuration update message may be the SN modification request message. In other words, when the quantity of DRBs configured by the MN changes, the MN initiates the SN modification process, and sends the SN modification request message to the SN. The modification request message includes the available DRB ID updated by the MN.

The configuration update message may further be a newly-defined message.

In this embodiment, uniqueness of the DRB ID can be ensured, so that the SN can add the DRB based on a radio resource management policy and a network condition of the SN, to reconfigure a mapping relationship between a QoS flow and the DRB, so that setting of the DRB is more flexible and effective.

Figure 16:
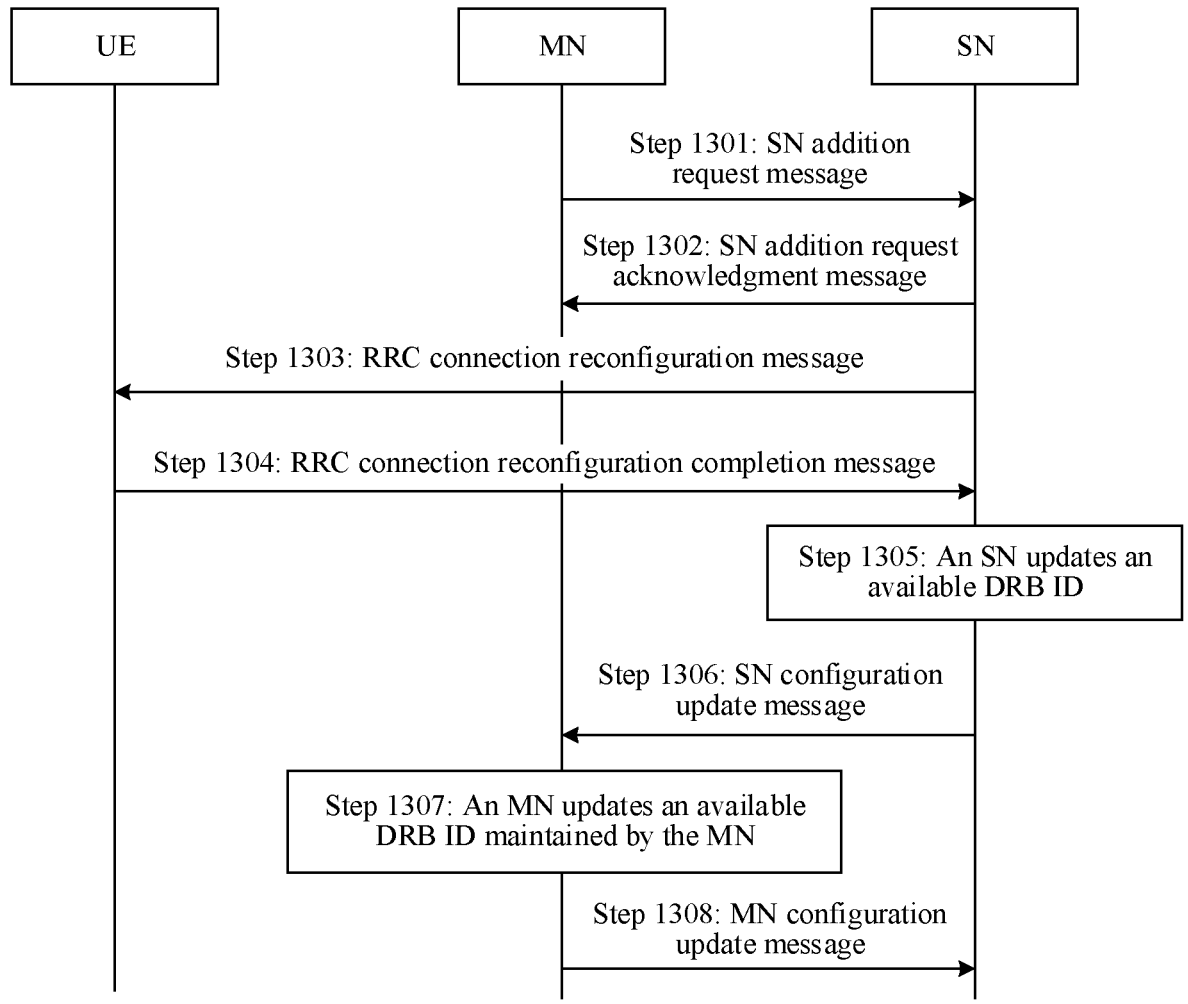
FIG. 16 is a flowchart of yet another method for obtaining a DRB identifier according to this application.

FIG. 16 is a flowchart of yet another method for obtaining a DRB identifier according to this application. As shown in FIG. 16, this embodiment includes UE, an MN, and an SN, and the method in this embodiment may include the following steps.

Step 1301: The MN sends an SN addition request message to the SN.

Step 1302: If the SN accepts an addition request, the SN replies an SN addition request acknowledgment message.

For specific implementations of step 1001 to step 1002, refer to specific explanations and descriptions of step 901 to step 902. Details are not described herein again.

Step 1303: The SN sends an RRC connection reconfiguration message to the UE, where the RRC connection reconfiguration message includes information about an updated mapping relationship between a QoS flow transmitted by the SN and a DRB. The mapping relationship between the QoS flow and the DRB may be a mapping relationship between an uplink QoS flow and a DRB.

Step 1304: The SN receives an RRC connection reconfiguration completion message sent by the UE.

Step 1305: The SN updates an available DRB ID.

Specifically, when the SN reconfigures the mapping relationship that is between the QoS flow and the DRB and that is born by the SN and needs to add a DRB or release a DRB, the SN initiates an SN modification process, and sends a modification requirement message to the MN. If the DRB needs to be added, before the SN initiates the SN modification process, the SN selects a DRB ID based on the available DRB ID provided by the MN, and determines anew mapping relationship between the QoS flow and the DRB.

Step 1306: The SN sends an SN configuration update message to the MN. The SN configuration update message carries the updated available DRB ID.

When a quantity of DRBs configured by the SN changes, the SN sends the updated available DRB ID to the MN by using the configuration update message. Reasons for change of the quantity of DRBs include that the SN adds a DRB and the SN releases a DRB.

The configuration update message may be an SN modification requirement message. In other words, when the quantity of DRBs configured by the SN changes, the SN initiates the SN modification process, and sends the SN modification requirement message to the MN. The modification request message includes the available DRB ID updated by the SN.

The configuration update message may further be a newly-defined message.

Step 1307: The MN updates an available DRB ID maintained by the MN.

Step 1308: The MN sends an MN configuration update message to the SN. The MN configuration update message includes the available DRB ID updated by the MN.

When a quantity of the DRBs configured by the MN changes, the MN sends the updated available DRB ID to the SN by using the configuration update message. Reasons for change of the quantity of DRBs include that the MN adds a DRB and the MN releases a DRB.

The configuration update message may be the SN modification request message. In other words, when the quantity of DRBs configured by the MN changes, the MN initiates the SN modification process, and sends the SN modification request message to the SN. The modification request message includes the available DRB ID updated by the MN.

The configuration update message may further be a newly-defined message.

In this embodiment, uniqueness of the DRB ID can be ensured, so that the SN can add the DRB based on a radio resource management policy and a network condition of the SN, to reconfigure a mapping relationship between a QoS flow and the DRB, so that setting of the DRB is more flexible and effective.

Figure 17:
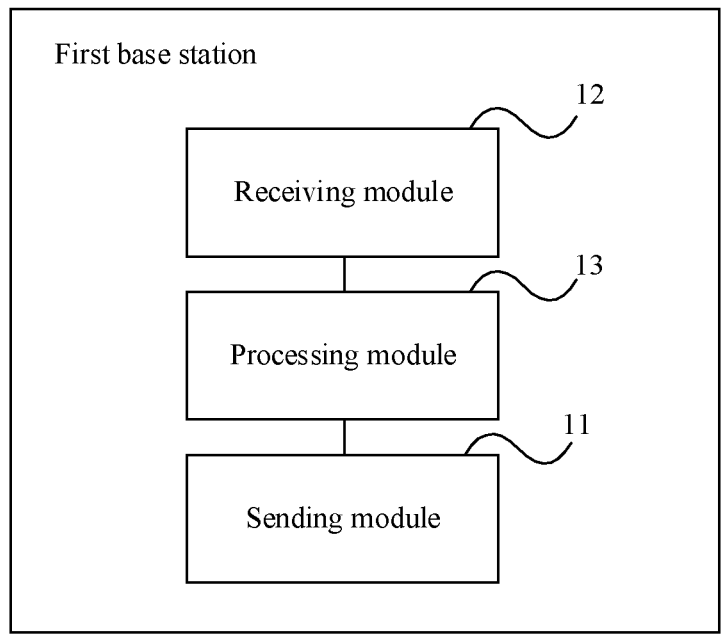
FIG. 17 is a schematic structural diagram of a first base station according to this application.

FIG. 17 is a schematic structural diagram of a first base station according to this application. As shown in FIG. 17, the first base station in this embodiment includes: a sending module 11 and a receiving module 12. The sending module 11 is configured to send a first message to a second base station, where the first message is used to request to add a data radio bearer DRB, and the receiving module 12 is configured to receive a second message sent by the second base station, where the second message is used to indicate an identifier of at least one DRB. The sending module 11 is further configured to send first information to user equipment, where the first information includes DRB configuration information, and the DRB configuration information includes the identifier of the at least one DRB.

Optionally, the first information further includes information about a mapping relationship between an uplink quality of service QoS flow and the at least one DRB.

Optionally, the first base station is a secondary eNB, and the second base station is a master eNB.

Optionally, the first message includes any one or more of the following information: indication information of requesting to add the DRB; a quantity of DRBs that request to be added; an identifier of a remapped QoS flow; packet information of a remapped QoS flow; or a packet index of a remapped QoS flow.

Optionally, the second message includes any one or more of the following information: an available DRB identifier; the identifier of the at least one DRB; an identifier of a QoS flow that allows to be mapped to the at least one DRB; an identifier of a QoS flow that rejects to be mapped to the at least one DRB; configuration information of a mapping relationship between the DRB and a QoS flow; configuration information of a mapping relationship between the DRB and a packet of a QoS flow; or configuration information of a mapping relationship between the DRB and a packet index of a QoS flow.

Optionally, the receiving module 12 is further configured to receive a third message sent by the second base station, where the third message is used to request to transfer at least one QoS flow to the first base station, or used to request the first base station to add at least one QoS flow, or used to request to transfer at least one DRB to the first base station, or used to request the first base station to add at least one DRB.

The third message includes any one or more of the following information: an identifier of the at least one QoS flow that is transferred to the first base station and a QoS parameter of the at least one QoS flow; a mapping relationship between the at least one QoS flow and the DRB; or indication information of a transfer type. The transfer type includes at least one of QoS flow transfer and DRB transfer.

Optionally, the sending module 11 is configured to send first information to the user equipment, including: sending a radio resource control reconfiguration message to the user equipment, where the radio resource control reconfiguration message includes the first information.

Optically, the sending module 11 is further configured to send a fourth message to the second base station, where the fourth message includes any one or more of the following information: an available DRB identifier; an identifier of a DRB selected by the first base station; or a mapping relationship that is between a QoS flow and a DRB and that is configured by the first base station.

Optionally, the first base station in this embodiment of this application may further include a processing module 13 and a storage module. The storage module is configured to store program code and data of the first base station, and the processing module 13 is configured to: invoke the program code and data of the storage module, and control the sending module 11 and the receiving module 12 in this embodiment to perform the foregoing operations.

The first base station in this embodiment may be configured to execute technical solutions of the foregoing method embodiments. The implementation principles and technical effects thereof are similar. Details are not described herein again.

Figure 18:
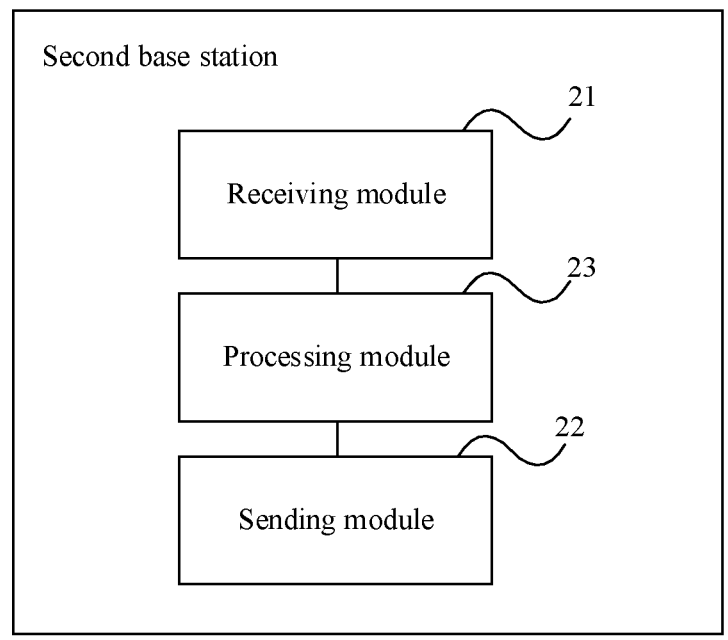
FIG. 18 is a schematic structural diagram of a second base station according to this application.

FIG. 18 is a schematic structural diagram of a second base station according to this application. As shown in FIG. 18, a second base station in this embodiment may include a receiving module 21 and a sending module 22. The receiving module 21 is configured to receive a first message sent by a first base station, where the first message is used to request to add a data radio bearer DRB; and the sending module 22 is configured to send a second message to the first base station, where the second message is used to indicate an identifier of at least one DRB.

Optionally, the first base station is a secondary eNB, and the second base station is a master eNB.

Optionally, the sending module 22 is further configured to send a third message to the first base station, where the third message is used to request to transfer at least one QoS flow to the first base station, or used to request the base station to add at least one QoS flow, or used to request to transfer at least one DRB to the first base station, or used to request the first base station to add at least one DRB.

The third message includes any one or more of the following information: an identifier of the at least one QoS flow that is transferred to the first base station and a QoS parameter of the at least one QoS flow; a mapping relationship between the at least one QoS flow and the DRB; or indication information of a transfer type. The transfer type includes at least one of QoS flow transfer and DRB transfer.

Optically, the receiving module 21 is further configured to receive a fourth message sent by the first base station, where the fourth message includes any one or more of the following information: an available DRB identifier; an identifier of a DRB selected by the first base station; or a mapping relationship that is between a QoS flow and a DRB and that is configured by the first base station.

Optionally, the second base station in this embodiment of this application may further include a processing module 23 and a storage module. The storage module is configured to store program code and data of the first base station, AND the processing module 23 is configured to: invoke the program code and data of the storage module, and control the sending module 22 and the receiving module 21 in this embodiment to perform the foregoing operations.

The second base station in this embodiment may be configured to perform technical solutions of the foregoing method embodiments. The implementation principles and technical effects thereof are similar. Details are not described herein again.

An embodiment of this application further provides another first base station, and a schematic structural diagram of the first base station is the same as FIG. 17. For details, refer to FIG. 17. A sending module of the first base station in this embodiment is configured to send a first message to a second base station, where the first message is used to indicate a currently available DRB identifier.

The sending module is further configured to send first information to user equipment, where the first information includes at least one of configuration information of an added DRB and an identifier of a released DRB, and the configuration information of the added DRB includes an identifier of the added DRB.

Optionally, the first base station sends the first message after updating a DRB identifier, to generate the currently available DRB identifier, where a reason for updating the DRB identifier includes at least one of adding a DRB and releasing a DRB.

Optionally, the first information further includes information about a mapping relationship between an uplink QoS flow and a DRB.

Optionally, the first base station is a secondary eNB, and the second base station is a master eNB; or the first base station is a master eNB, and the second base station is a secondary eNB.

Optically, the first message includes any one or more of the following information: the currently available DRB identifier; an identifier of a DRB occupied by the first base station; an identifier of a DRB released by the first base station; or a mapping relationship that is between a QoS flow and a DRB and that is configured by the first base station.

Optionally, the receiving module is configured to receive a second message sent by the second base station, where the second message is used to indicate an available DRB identifier; and the processing module is configured to perform DRB identifier update on the available DRB identifier, to generate the currently available DRB identifier.

Optically, the second message includes any one or more of the following information: the currently available DRB identifier; an identifier of a DRB occupied by the second base station; an identifier of a DRB released by the second base station; or a mapping relationship that is between a QoS flow and a DRB and that is configured by the second base station.

Optionally, the receiving module is further configured to receive a third message sent by the second base station, where the third message is used to request to transfer at least one QoS flow to the first base station, or used to request the first base station to add at least one QoS flow, or used to request to transfer at least one DRB to the first base station, or used to request the first base station to add at least one DRB.

The third message includes any one or more of the following information: an identifier of the at least one QoS flow that is transferred to the first base station and a QoS parameter of the at least one QoS flow; a mapping relationship between the at least one QoS flow and the DRB; indication information of a transfer type; or an available DRB identifier. The transfer type includes at least one of QoS flow transfer and DRB transfer.

The first base station in this embodiment may be used to execute technical solutions of the foregoing method embodiments. The implementation principles and technical effects are similar. Details are not described herein again.

It should be noted that, the first base station in the embodiment shown in FIG. 17 may correspondingly have an object device with a similar function, for example, a base station. The sending module 11 in this embodiment of this application may correspond to a transmitter of the base station, or may correspond to a transceiver of the base station. The receiving module 12 may correspond to a receiver of the base station, or may correspond to the transceiver of the base station. The processing module 13 may correspond to a processor of the base station. Herein, the processor may be a central processing unit (Central Processing Unit, CPU), or an application specific integrated circuit (Application Specific Integrated Circuit, ASIC), or one or more integrated circuits that implement this embodiment of this application. The base station may further include a memory, the memory is configured to store an instruction and code, and the processor invokes the instruction and code of the memory, and controls the sending module 11 and the receiving module 12 in this embodiment of this application to perform the foregoing operations.

It should be noted that, the second base station in the embodiment shown in FIG. 18 may correspondingly have an object device with a similar function, for example, the base station. The sending module 22 in this embodiment of this application may correspond to the transmitter of the base station, or may correspond to the transceiver of the base station. The receiving module 21 may correspond to the receiver of the base station, or may correspond to the transceiver of the base station. The processing module 23 may correspond to the processor of the base station. Herein, the processor may be a CPU, or an ASIC, or one or more integrated circuits that implement this embodiment of this application. The base station may further include the memory, the memory is configured to store an instruction and code, and the processor invokes the instruction and code of the memory, and controls the sending module 22 and the receiving module 21 in this embodiment of this application to perform the foregoing operations.

When at least some of functions of the method for obtaining a DRB identifier in the embodiments of this application are implemented by software, an embodiment of this application further provides a computer-readable storage medium. The computer-readable storage medium is configured to store a computer software instruction used by the first base station. When the computer-readable storage medium runs on a computer, the computer is enabled to perform various possible methods for obtaining a DRB identifier according to the foregoing method embodiments. When the computer-executable instruction is loaded and executed on the computer, the procedure or functions according to the embodiments of this application may be all or partially generated. The computer instruction may be stored in the computer-readable storage medium, or may be transmitted from one computer-readable storage medium to another computer-readable storage medium. For the transmission, the computer instruction may be transmitted to another website, computer, server, or data center in a wireless (for example, cellular communication, infrared, short distance radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid State Disk (SSD)), or the like.

When at least some of functions of the method for obtaining a DRB identifier in the embodiments of this application are implemented by software, an embodiment of this application further provides a computer-readable storage medium. The computer-readable storage medium is configured to store a computer software instruction used by the second base station. When the computer-readable storage medium runs on a computer, the computer is enabled to perform various possible methods for obtaining a DRB identifier according to the foregoing method embodiments. When the computer-executable instruction is loaded and executed on the computer, the procedure or functions according to the embodiments of this application may be all or partially generated. The computer instruction may be stored in the computer-readable storage medium, or may be transmitted from one computer-readable storage medium to another computer-readable storage medium. For the transmission, the computer instruction may be transmitted to another website, computer, server, or data center in a wireless (for example, cellular communication, infrared, short distance radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, an SSD).

In addition, an embodiment of this application further provides a computer program product that includes an instruction, that is, a software product. When the computer program product runs on a computer, the computer is enabled to perform various possible methods for obtaining a DRB identifier according to the foregoing method embodiments. The implementation principle and technical effects thereof are similar. Details are not described herein again Finally, it should be noted that the foregoing embodiments are merely intended for describing the technical solutions of this application other than limiting the technical solutions of this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for obtaining a data radio bearer identifier, comprising:
   receiving, by a first base station, a first message from a second base station, wherein the first message comprises at least one of:
      an identifier of at least one Quality of Service (QoS) flow that the second base station requests the first base station to transmit, and at least one QoS parameter corresponding to the at least one QoS flow; or
      an identifier of an available data radio bearer (DRB);
   sending, by the first base station, a second message to the second base station, wherein the second message comprises a quantity of data radio bearers (DRBs) that the first base station requests to add; and
   receiving, by the first base station, a third message from the second base station, wherein the third message comprises a DRB identifier identifying a DRB that the second base station allows the first base station to add,
   wherein the first base station is a secondary node (SN) of a dual connectivity, the second base station is a master node (MN) of the dual connectivity, the first message is an SN addition request message, and the second message is an SN addition request acknowledgment message.

2. The method according to claim 1, further comprising:
   sending, by the first base station, a fourth message to the second base station, wherein the fourth message comprises:
      an identifier of a DRB released by the first base station, wherein the fourth message is an SN modification requirement message.

3. The method according to claim 1, wherein the second message comprises at least one of the following information:
   a quantity of DRBs that the first b station is requested to add;

an identifier of a remapped QoS flow;
packet information of a remapped QoS flow; or
a packet index of a remapped QoS flow.

4. The method according to claim 1, further comprising:
sending, by the first base station, a fourth message to the second base station, wherein the fourth message comprises at least one of the following information:
an identifier of an available DRB;
an identifier of a DRB selected by the first base station; or
a mapping relationship between a QoS flow and a DRB, the mapping relationship being configured by the first base station.

5. A method for obtaining a data radio bearer identifier, comprising:
receiving, by a rust base station, a rust message from a second base station, wherein the rust message comprises an identifier of at least one Quality of Service (QoS) flow that the second base station requests the rut base station to transmit and a corresponding QoS parameter;
sending, by the first base station, a second message to the second base station, wherein the second message includes a quantity of data radio bearers (DRBs) that the first base station requests to add; and
receiving, by the rust base station, a third message from the second base station, wherein the third message comprises a DRB identifier identifying a DRB that the second base station allows the rust base station to add,
wherein the first base station is a secondary node (SN) of a dual connectivity, the second base station is a master node (MN) of the dual connectivity, the first message is an SN addition request message, the second message is an SN modification requirement message, and the third message is an SN modification requirement acknowledgment message.

6. The method according to claim 5, wherein the third message further comprises at least one of the following information:
the identifier of the at least one QoS flow that is transferred to the first base station and a QoS parameter of the at least one QoS flow;
a mapping relationship between the at least one QoS flow and the DRB; or
indication information indicating a transfer type, wherein the transfer type comprises at least one of QoS flow transfer or DRB transfer.

7. The method according to claim 5, further comprising:
transmitting, by the first base station, a fourth message to the second base station, wherein the fourth message comprises at least one of the following information:
an identifier of an available DRB;
an identifier of a DRB selected by the first base station; or
a mapping relationship between a QoS flow and a DRB, the mapping relationship being configured by the first base station.

8. A first base station, comprising:
a receiver, configured to receive a first message sent by a second base station, wherein the first message comprises at least one of:
an identifier of at least one Quality of Service (QoS) flow that the second base station requests the first base station to transmit, and at least one QoS parameter corresponding to the at least one QoS flow; or
an identifier of an available data radio bearer (DRB); and
a transmitter, configured to send a second message to the second base station, wherein the second message includes a quantity of data radio bearers (DRBs) that the first base station requests to add,
wherein the receiver is further configured to receive a third message from the second base station, and the third message comprises a DRB identifier identifying a DRB that the second base station allows the first base station to add; and
wherein the first base station is a secondary node (SN) of a dual connectivity, the second base station is a master node (MN) of the dual connectivity, the first message is an SN addition request message, and the second message is an SN addition request acknowledgment message.

9. The first base station according to claim 8, wherein the transmitter is further configured to send a fourth message to the second base station, the fourth message comprises an identifier of a DRB released by the first base station, and the fourth message is a SN modification requirement message.

10. The first base station according to claim 8, wherein the second message comprises at least one of the following information:
a quantity of DRBs that the first base station is requested to add;
an identifier of a remapped QoS flow,
packet information of a remapped QoS flow, or
a packet index of a remapped QoS flow.

11. The first base station according to claim 8, wherein the transmitter is further configured to:
send, by the first base station, a fourth message to the second base station, wherein the fourth message comprises at least one of the following information:
an identifier of a DRB selected by the first base station; or
a mapping relationship between a QoS flow and a DRB, the mapping relationship being configured by the first base station.

12. A first base station, comprising:
a receiver, configured to receive a first message sent by a second base station, wherein the first message comprises an identifier of at least one Quality of Service (QoS) flow that the second base station requests the first base station to transmit, and a corresponding QoS parameter; and
a transmitter, configured to send a second message to the second base station, wherein the second message includes a quantity of data radio bearers (DRBs) that the first base station requests to add,
wherein the receiver is further configured to receive a third message from the second base station, and the third message comprises a DRB identifier identifying a DRB that the second base station allows the first base station to add; and
wherein the first base station is a secondary node (SN) of a dual connectivity, the second base station is a master node (MN) of the dual connectivity, the first message is an SN addition request message, the second message is an SN modification requirement message, and the third message is an SN modification requirement acknowledgment message.

13. The first base station according to claim 12, wherein the third message further comprises at least one of the following information:
the identifier of the at least one QoS flow that is transferred to the first base station and a QoS parameter of the at least one QoS flow, a mapping relationship between the at least one QoS flow and the DRB; or indication information indicating a transfer type, wherein the transfer type comprises at least one of QoS flow transfer or DRB transfer.

\* \* \* \* \*

UNITED STATES PATENT AND TRADEMARK OFFICE
CERTIFICATE OF CORRECTION

PATENT NO. : 11,277,764 B2
APPLICATION NO. : 16/636468
DATED : March 15, 2022
INVENTOR(S) : Haibo Xu et al.

It is certified that error appears in the above-identified patent and that said Letters Patent is hereby corrected as shown below:

In the Claims

Claim 3, at Column 34, Line 66, replace "b" with "base";

Claim 5, at Column 35, Lines 15 and 16, replace "rust" with "first" in all three instances;

Claim 5, at Column 35, Line 18, replace "rut" with "first";

Claim 5, at Column 35, Line 26, replace "rust" with "first"; and

Claim 5, at Column 35, Line 28, replace "rust" with "first".

Signed and Sealed this
Tenth Day of May, 2022

Katherine Kelly Vidal
*Director of the United States Patent and Trademark Office*